US011825475B2

(12) United States Patent
Liu et al.

(10) Patent No.: US 11,825,475 B2
(45) Date of Patent: Nov. 21, 2023

(54) MULTI-TRANSMITTER SCHEDULING USING SUB-SLOT BASED PHYSICAL SIDELINK SHARED CHANNELS

(71) Applicant: QUALCOMM Incorporated, San Diego, CA (US)

(72) Inventors: Chih-Hao Liu, San Diego, CA (US); Jing Sun, San Diego, CA (US); Lik Hang Silas Fong, Bridgewater, NJ (US); Yisheng Xue, San Diego, CA (US); Xiaoxia Zhang, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 17/377,100

(22) Filed: Jul. 15, 2021

(65) Prior Publication Data
US 2023/0012562 A1 Jan. 19, 2023

(51) Int. Cl.
*H04W 4/00* (2018.01)
*H04W 72/20* (2023.01)
*H04W 52/52* (2009.01)
*H04W 72/0446* (2023.01)

(52) U.S. Cl.
CPC ........... *H04W 72/20* (2023.01); *H04W 52/52* (2013.01); *H04W 72/0446* (2013.01)

(58) Field of Classification Search
CPC .. H04W 72/20; H04W 52/52; H04W 72/0446
See application file for complete search history.

(56) References Cited

U.S. PATENT DOCUMENTS

| | | | |
|---|---|---|---|
| 11,122,527 B2 * | 9/2021 | Li | H04W 72/20 |
| 2020/0322939 A1 * | 10/2020 | Cao | H04W 72/02 |
| 2020/0336253 A1 * | 10/2020 | He | H04W 4/40 |
| 2021/0297221 A1 * | 9/2021 | Lee | H04L 1/1864 |
| 2021/0352597 A1 * | 11/2021 | Do | H04W 72/0446 |
| 2022/0022169 A1 * | 1/2022 | Peng | H04W 72/20 |
| 2022/0159674 A1 * | 5/2022 | Deng | H04W 72/566 |
| 2022/0272727 A1 * | 8/2022 | Salim | H04L 5/0053 |

(Continued)

FOREIGN PATENT DOCUMENTS

WO 2020033704 A1 2/2020

OTHER PUBLICATIONS

Huawei, et al., "Sidelink Physical Layer Structure for NR V2X", 3GPP TSG RAN WG1 Meeting # 98bis, R1-1910054, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, 35 Pages, XP051809064, figure 11.

(Continued)

*Primary Examiner* — Abdelnabi O Musa
(74) *Attorney, Agent, or Firm* — Haynes and Boone LLP

(57) ABSTRACT

Wireless communications systems and methods related to communicating information are provided. A method of wireless communication performed by a user equipment (UE) may include mapping a sub-physical sidelink shared channel (sub-PSSCH), sidelink control information (SCI), and an automatic gain control (AGC) symbol to a sub-slot of a plurality of sub-slots of a slot and transmitting, to at least one other UE, a transport block via the sub-PSSCH of the sub-slot.

30 Claims, 11 Drawing Sheets

(56) References Cited

U.S. PATENT DOCUMENTS

2022/0303969 A1* 9/2022 Hwang ............... H04W 72/20
2022/0330278 A1* 10/2022 Hong ................... H04W 92/18
2023/0022077 A1* 1/2023 Liu .................. H04W 72/0446

OTHER PUBLICATIONS

International Search Report and Written Opinion—PCT/US2022/034203—ISA/EPO—dated Oct. 10, 2022.
Sequans Communications: "On NR Sidelink Physical Layer Structure", 3GPP TSG RAN WG1 Meeting #99, R1-1913010, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, 8 Pages, XP051820261, the whole document.

* cited by examiner

MULTI-TRANSMITTER SCHEDULING USING SUB-SLOT BASED PHYSICAL SIDELINK SHARED CHANNELS

TECHNICAL FIELD

This application relates to wireless communication systems, and more particularly to methods and devices for wireless communication using sub-slot based physical sidelink shared channels.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) may include mapping a sub-physical sidelink shared channel (sub-PSSCH), sidelink control information (SCI), and an automatic gain control (AGC) symbol to a sub-slot of a plurality of sub-slots of a slot; and transmitting, to at least one other UE, a transport block via the sub-PSSCH of the sub-slot.

In an additional aspect of the disclosure, a method of communication performed by a base station (BS) may include transmitting, to a user equipment (UE), a configuration indicating a plurality of sub-slots within a slot, wherein the configuration comprises a number of the sub-slots within the slot; a starting position of each sub-slot within the slot; and a duration of each sub-slot within the slot.

In an additional aspect of the disclosure, a UE may include a transceiver, a memory, and a processor coupled to the transceiver and the memory, the UE may be configured to map a sub-physical sidelink shared channel (sub-PSSCH), sidelink control information (SCI), and an automatic gain control (AGC) symbol to a sub-slot of a plurality of sub-slots of a slot; and transmit, to at least one other UE, a transport block via the sub-PSSCH of the sub-slot.

In an additional aspect of the disclosure, a BS may include a transceiver, a memory, and a processor coupled to the transceiver and the memory, the BS may be configured to transmit, to a user equipment (UE), a configuration indicating a plurality of sub-slots within a slot, wherein the configuration comprises a number of the sub-slots within the slot; a starting position of each sub-slot within the slot; and a duration of each sub-slot within the slot.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
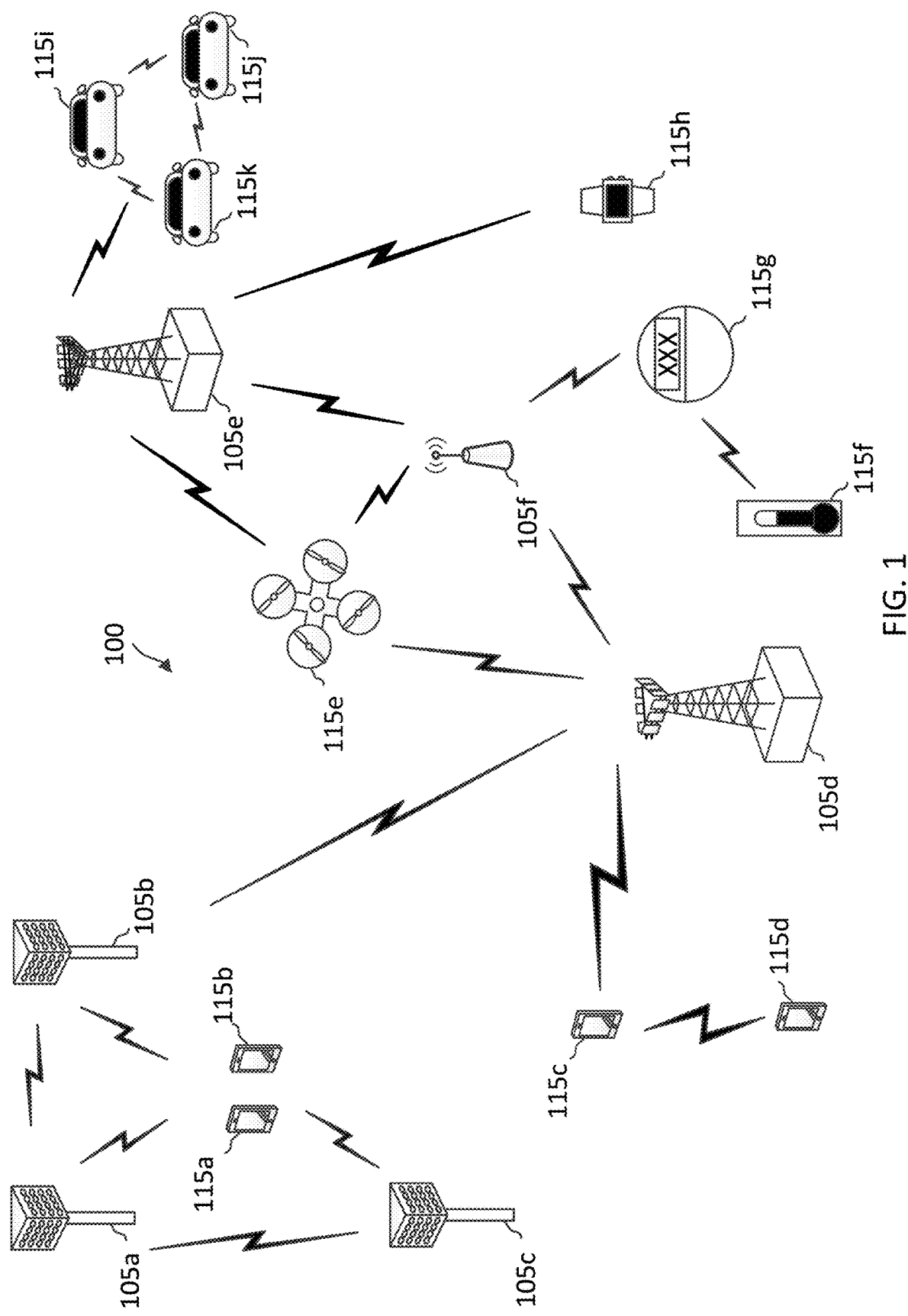
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for multiple UEs to communicate transport blocks (TBs) to multiple UEs via sub-slots in a slot. The disclosed approaches include various methods of partitioning the sub-slots in the slot and mapping sub-PSSCHs, sidelink control information (SCI), and automatic gain control (AGC) symbols to the sub-slots. The disclosed approaches further include various methods of transmitting the TBs to UEs that communicate using sidelink communications.

In some aspects of the present disclosure, the latency of wireless communications, including sidelink control and data communications, may be reduced by multiple UEs transmitting multiple TBs in sub-slots in a slot as compared to transmitting a single TB to a single UE in the slot.

In accordance with the present disclosure, partitioning a slot into multiple sub-slots and mapping sub-PSSCHs, SCIs, and AGC symbols to the sub-slots in a slot may facilitate more efficient use and optimization of the frequency resources, higher reliability of the wireless communications network, and reduced transmission latency. In this regard, wireless communication applications requiring low latency such as vehicle-to-everything (V2X) and industrial Internet-of-Things (IoT) may benefit from the methods and devices of the present disclosure.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). ABS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115g (e.g., a meter, a programmable logic controller, an IoT device, a robot, a vehicle, etc.) may map a sub-PSSCH, sidelink control information (SCI), and an automatic gain control (AGC) symbol to a sub-slot of a plurality of sub-slots of a slot. A sub-PSSCH may be a PSSCH mapped to a set of symbols of a sub-slot. As described in detail below with reference to FIGS. 3-6, a sub-slot may include a number of symbols within a slot. A slot may include a plurality of sub-slots, each sub-slot including a number of symbols. A sub-PSSCH may carry information including, without limitation, a second stage SCI-2, a transport block, or padding. In some aspects, the UE 115g may map multiple sub-PSSCHs, SCI, and AGC symbols to multiple sub-slots within a slot. The UE 115g may transmit, to at least one other UE 115, a transport block via the sub-PSSCH of the sub-slot. In some instances, each of the sub-slots may be used by a different UE (e.g., UEs 115h, 115f) to transmit a TB to another UE over a sub-slots of a sidelink channel. In this manner, the UE 115g may increase the utilization of time/frequency resources within a single slot as compared to a single UE transmitting to a single UE per slot. By partitioning the symbols and/or resource elements into multiple sub-slots within the slot, each sub-slot may carry a different TB destined to a different UE.

In some aspects, the BS 105f may transmit, to UE 115g, a configuration indicating a plurality of sub-slots within a slot. The configuration may include, without limitation, a number of the sub-slots within the slot, a starting position of each sub-slot within the slot, and a duration of each sub-slot within the slot. In this regard, the BS 105f may transmit the configuration in an RRC configuration message, a DCI message, and/or a MAC control element signaling via a physical downlink shared channel (PDSCH), a physical downlink control channel (PDCCH), or other suitable channel. The configuration transmitted by the BS 105f may be received by the UE 115g and used by the UE 115g to partition a slot into sub-slots, map the sub-PSSCHs, SCI, and AGC symbols to the sub-slots, configure the SCI-1, and/or configure the SCI-2.

Figure 2:
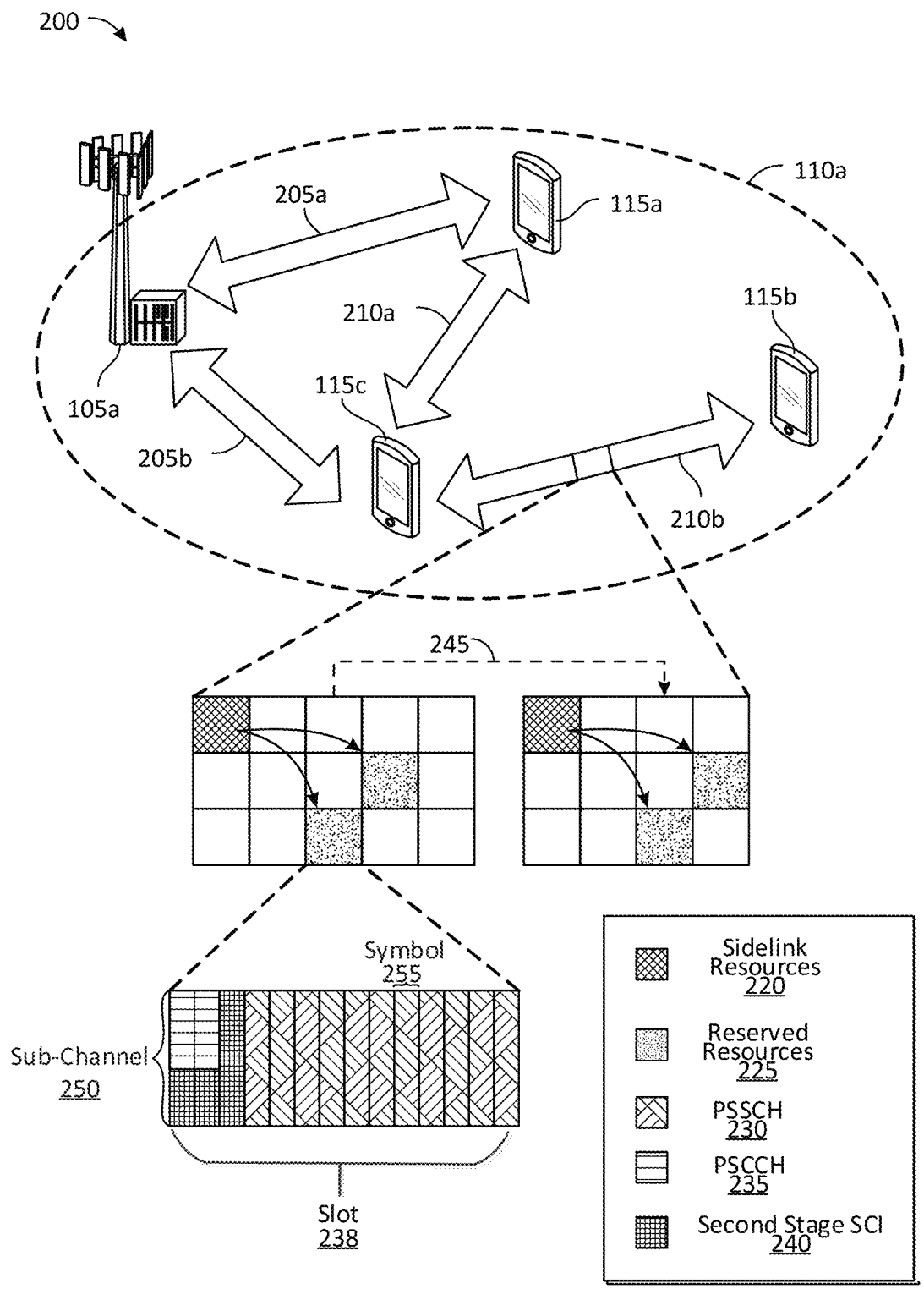
FIG. 2 illustrates sidelink resources associated with a wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

The sidelink UEs 115 may attempt to decode the reserved resources 225 indicated by the first stage SCI-1. In some aspects, the reserved resources 225 may be used for retransmission of sidelink data or the first stage SCI-1. Additionally or alternatively, the reserved resources 225 may include resources for sidelink transmissions, such as a PSSCH 230. As will be described in detail below with reference to FIGS. 3-7, the slot 238 may be partitioned into multiple sub-slots. The sub-slots may be transmitted via PSSCH 230 using one or more symbols 255. In some examples, the PSSCH 230 may be transmitted via one or more time or frequency resources via one or more full or partial symbols 255. A second stage SCI-2 240 may be transmitted via one or more symbols 255 of the PSSCH 230. The second stage SCI-2 240 may be transmitted in a symbol(s) near or at the beginning of a slot. The second stage SCI-2 240 may include an indication of which of the reserved resources 225 the transmitting UE 115 may use for sidelink transmissions. The second stage SCI-2 240 may thereby be received and decoded by sidelink UEs 115 intended to receive and decode the corresponding sidelink communications.

In some aspects, the transmitting UE 115 may transmit first-stage SCI-1 to one or more receiving UEs 115 indicating whether multiple sub-slots are enabled or disabled for the slot 238. In this regard, the transmitting UE 115 may transmit the SCI-1 over the PSCCH 235. The UE 115 may transmit the SCI-1 indicating a sub-slot configuration in the time and/or frequency domain for the multiple sub-slots. The UE 115 may transmit a PSCCH 235 communication that includes SCI-1 control information applicable to all of the sub-slots in the slot. Additionally or alternatively, the UE 115 may transmit a PSCCH 235 communication that includes SCI-1 control information applicable to one or more sub-slots and/or a subset of the sub-slots in the slot 238.

Figure 3:
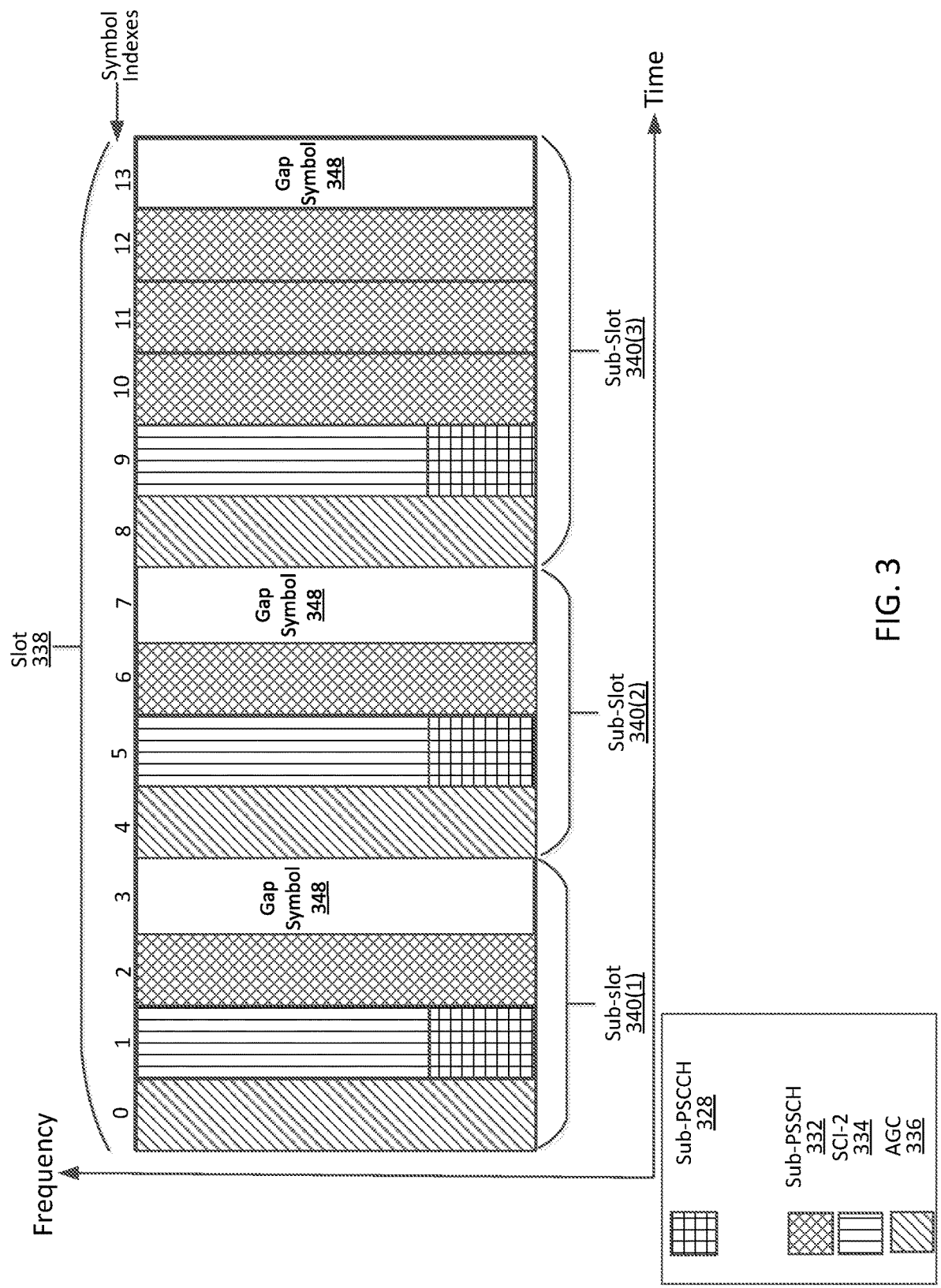
FIGS. 3-5 illustrate a slot partitioned into sub-slots according to some aspects of the present disclosure.

FIG. 3 illustrates a slot 338 partitioned into sub-slots 340 according to some aspects of the present disclosure. In FIG. 3, the x-axis represents time in some arbitrary units and the Y-axis represents frequency in some arbitrary units. In some aspects, the UE (e.g., the UE 115, the UE 800) may map a sub-PSSCH 332, an SCI 334, and an AGC symbol 336 to any or all of the sub-slots 340 in a slot 338. The UE 115 may map multiple sub-PSSCHs 332, SCIs 334, and AGC symbols 336 to multiple sub-slots 340 within the slot 338. In some instances, each of the sub-PSSCHs 332, SCIs 334, and AGC symbols 336 mapped in a sub-slot 340 may be used by a different UE 115 to transmit a TB to a different UE 115 over a sidelink channel. In this manner, the UEs 115 may increase the utilization of time/frequency resources within the slot 338 as compared to a single UE transmitting a TB to a single UE in the slot 338.

By partitioning the slot 338 into the plurality of sub-slots 340, each sub-slot 340(1) . . . 340(3) may be utilized by a different UE 115 to transmit a TB, facilitating the transmission of multiple TBs by multiple UEs 115 in a single slot 338. In some instances, the UE 115 that partitions the slot into the plurality of sub-slots and/or transmits the sub-slot structure to other UEs 115 may be referred to as a leading UE. In some instances, the UEs 115 that receive the sub-slot structure from the leading UE 115 may be referred to as following UEs 115. In some instances, the leading UE 115 may assign each of the following UEs 115 a particular sub-slot of the plurality of sub-slots in which the following UE 115 may transmit a TB. In some instances, the following UEs 115 will be assigned and transmit during sub-slots following the leading sub-slot of the plurality of sub-slots. In some instances, the leading UE 115 indicates the sub-slot assignments of the following UEs 115 in sidelink control information (SCI). In some instances, the UE 115 may be a leading UE 115 that receives a sub-slot partitioning configuration from a BS (e.g., BS 105 or BS 900). The UE 115 may receive a resource pool (RP) configuration from the BS 105 that defines the RP for the sub-slots 340. In this regard, the UE 115 may receive the sub-slot 340 and/or RP configurations in an RRC message and/or a DCI message (e.g., a DCI-3 signal, DCI-1 signal). The leading UE 115 may partition the slot 338 into a plurality of sub-slots 340 based on the sub-slot configuration and/or the RP configuration. The leading UE 115 may transmit the sub-slot structure to the following UEs 115. In some instances, the leading UE 115 communicates the sub-slot structure to the following UEs 115 in SCI. In some aspects, the leading UE 115 may transmit a TB in a leading sub-slot 340(1) (e.g., the earliest sub-slot in time) of the plurality of sub-slots 340 defined for the slot 338. The UE 115 may transmit the SCI with the sub-slot structure to the following UEs 115 in the leading sub-slot 340(1). The leading UE 115 may assign each of the following UEs 115 a particular sub-slot 340 of the plurality of sub-slots 340(1) . . . 340(3) in which the following UE 115 may transmit a TB. In some instances, the leading UE 115 indicates the assignment of the following UEs 115 to the sub-slots 340 in the sub-slot structure communicated to the following UEs 115 in the SCI.

In some aspects, the UE 115 partitions the slot 338 such that each sub-slot 340 occupies multiple symbols within the slot 338. For example, a slot 338 may include 2, 3, 4, or more sub-slots. In some instances, a slot may include 14 symbols. A sub-slot 340 may occupy 2, 3, 4, 5, 6, or more symbols. In some aspects, each sub-slot 340 may occupy contiguous symbols within the slot 338. In this regard, each sub-slot 340 may occupy groups of symbols that are contiguous in time. The group of contiguous symbols may include any number of symbols contained within the slot 338. Referring to FIG. 3, the sub-slot 340(1) may occupy symbol indexes 0-3. The sub-slot 340(2) may occupy symbol indexes 4-7. The sub-slot 340(3) may occupy symbol indexes 8-13, or any other group of contiguous symbols within the slot 338. The number of symbols occupying the sub-slot 338 may be based on the size of the TB to be transmitted. A larger TB may require more symbols than a smaller TB.

In some aspects, the UE 115 may map an AGC symbol 336 to each sub-slot 340 of the slot 338. In some aspects, the UE 115 mapping the AGC symbol 336 to the sub-slot 340 of the plurality of sub-slots 340(1) . . . 340(3) of the slot 338 may be part of the UE 115 mapping an AGC symbol 336 to each sub-slot 340 of the plurality of slots 340(1) . . . 340(3) of the slot 338. A receiving UE 115 may receive a TB from a transmitting UE 115 in a sub-PSSCH 332. The signal strength of the sub-PSSCH 332 may vary over a wide dynamic range depending on channel attenuation and interference. The AGC symbol 336 may be used to adjust the strength of the received signal in order to reduce the quantization error at the analog to digital converter of the receiving UE 115. In some instances, the AGC symbol 336 may help a UE's receiver to adjust the gain of a front-end amplifier. In some aspects, the UE 115 may map the AGC symbol 336 to the leading symbol (e.g., the earliest symbol)

in the sub-slot 340. The UE 115 may map the AGC symbol 336 to the leading symbol in order for a receiving UE 115 to properly set the gain of the amplifier and successfully decode the subsequent symbols of the sub-slot 340. For example, the UE 115 may map the AGC symbol 336 to the leading symbols 0, 4, and 8 in sub-slots 340(1), 340(2), and 340(3), respectively.

In some aspects, the UE 115 may map a sub-PSSCH 332 to each sub-slot 340 of the slot 338. In some aspects, the UE 115 mapping the sub-PSSCH 332 to the sub-slot 340 of the plurality of sub-slots 340(1) . . . 340(3) of the slot 338 may be part of the UE 115 mapping a sub-PSSCH 332 to each sub-slot 340 of the plurality of slots 340(1) . . . 340(3) of the slot 338. Each sub-PSSCH 332 of each sub-slot 340 may occupy one or more symbols. The sub-PSSCHs 332 may carry one or more transport blocks (TBs) that include the data to be communicated by a transmitting UE 115. The number of symbols the sub-PSSCH 332 occupies may be based on the size of the TB. As described above, in accordance with the present disclosure each sub-slot 340 may be utilized by a different UE 115 to transmit the TB(s).

In some aspects, the UE may map a gap symbol 348 (e.g., a guard period) to each sub-slot 340 of the slot 338. The gap symbol 348 of each sub-slot 340 may occupy a full symbol. In some instances, the UE 115 may map the gap symbol 348 to an ending symbol of the sub-slot 340. For example, the UE 115 may map the gap symbol 348 to the ending symbols 3, 7, and 13 in sub-slots 340(1), 340(2), and 340(3), respectively. The gap symbol 348 may be used for timing adjustments and/or for allowing UEs 115 to switch between transmission and reception.

In some aspects, the UE 115 may map an SCI to each sub-slot 340 of the slot 338. In some aspects, the UE 115 mapping the SCI to the sub-slot 340 of the plurality of sub-slots 340(1) . . . 340(3) of the slot 338 may be part of the UE 115 mapping the SCI to each sub-slot 340 of the plurality of slots 340(1) . . . 340(3) of the slot 338. The SCI may include a first-stage SCI-1 and/or a second-stage SCI-2. Splitting the SCI in two stages (first-stage SCI-1 and second-stage SCI-2) may allow UEs 115 to decode the first-stage SCI-1 for channel sensing purposes, such as determining the resources reserved by other transmissions. The second-stage SCI-2 may provide additional control information that allows the UE 115 to receive and decode a transmission. In this regard, the UE 115 may transmit the SCI-1 to another UE 115 in a physical sidelink control channel (PSCCH). Referring to FIG. 3, the leading UE 115 may transmit the sub-slot structure to the following UEs 115 in the sub-PSCCHs 328. The SCI-1 carried by the sub-PSCCH 328 may include a beta offset associated with an SCI-2 carried by sub-PSSCH 332. The SCI-1 may include a modulation and encoding scheme (MCS) of the sub-PSSCH 332. The SCI-1 may include resource assignments for at least one sub-slot 340 of the plurality of sub-slots 340(1) . . . 340(3) of a slot 338 and/or resource assignments for at least one sub-slot 340 of another slot (e.g. a future slot). The resource assignments for the current slot 338 or for a future slot may be used by transmitting UE(s) 115 for retransmissions of TB(s) that are not successfully decoded by receiving UE(s) 115. The UEs 115 may be operating in a sidelink mode 1 in which the leading UE 115 receives the resource assignments from a serving BS (e.g., the BS 105 or BS 900). The leading UE 115 may transmit the resource assignments to the following UEs 115 in the SCI-1 carried by the sub-PSCCHs 328.

In some aspects, the UE 115 may transmit the SCI-2 334 to another UE 115 in a sub-PSSCH 332. The SCI-2 334 may include information used for decoding the sub-PSSCH 332 and for supporting HARQ feedback. The SCI-2 may include a UE 115 source ID and a UE 115 destination ID associated with a TB. The SCI-2 may also include a one-bit new data indicator (NDI) that is used to specify whether the TB sent in the sub-PSSCH 332 corresponds to the transmission of new data or a retransmission.

In some aspects, the UE 115 may transmit a sub-PSSCH 332 in a sub-slot 340 that includes at least one demodulation reference signal (DMRS). A DMRS may be a reference signal used by the receiving UE(s) 115 for channel estimation and/or compensating for Doppler effects at high UE speeds. The DMRS may be included in each sub-slot 340 of the plurality of sub-slots 340(1) . . . 340(3) of a slot 338. In this regard, the DMRS may be located anywhere within the sub-slot 340. For example, the DMRS may be located in the first symbol of the sub-slot, the last symbol of the sub-slot, or an intermediate symbol of the sub-slot 340. In some aspects, the DMRS may include all resource elements (REs) within the symbol. In some aspects, the DMRS may include a portion of the REs within the symbol. For example, the DMRS may include a portion of the REs within the same symbol that occupies the SCI-2 334.

In some aspects, the UE 115 may partition a slot 338 into multiple sub-slots 340. Each of the multiple sub-slots 340 may be used by a different UE 115 to transmit a TB via a sub-PSSCH 332. Each of the sub-slots 340 may include a structure similar to a slot 338 structure. For example, each sub-slot 340 may include an AGC symbol 336, a sub-PSCCH 328 (e.g., carrying an SCI-1), a sub-PSSCH 332 (e.g., carrying data, an SCI-2, and/or DMRS), and/or a gap symbol 348. Some UEs 115 may support both the slot 338 structure and the sub-slot 340 structure. Some UEs 115 may support only the sub-slot 340 structure. FIG. 3 illustrates an example of the sub-slot structure of a greenfield network that only includes UEs 115 that support the sub-slot structure. In contrast to the examples of FIGS. 4 and 5 below, the sub-slot structure of FIG. 3 includes a sub-slot SCI-1 and omits a slot SCI-1. Some UEs 115 may support only the slot 338 structure. The SCI-1 may include a sub-slot SCI-1 and/or a slot SCI-1. In some aspects, the sub-slot SCI-1 may be understood only by those UEs 115 that support the sub-slot 340 structure. In some instances, the UE 115 may also map a sub-PSCCH 332 to the sub-slot 340 of the plurality of sub-slots 340(1) . . . 340(3) of the slot 338. In some instances, the sub-slot 340(1) is a leading sub-slot (i.e., the earliest sub-slot in time) of the plurality of sub-slots 340(1) . . . 340(3). The UE 115 may transmit a sub-slot SCI-1 via the sub-PSCCH 328 to the other UEs 115 while refraining from transmitting a slot SCI-1 when the other UEs 115 support the sub-slot structure. For example, the network may be a so called "greenfield" network that only includes UEs 115 that support the sub-slot structure. By supporting the sub-slot structure, the other UEs 115 may be able to decode and understand the contents of the sub-slot SCI-1 such that a slot SCI-1 can be omitted. FIG. 3 illustrates an example of the sub-slot structure of a greenfield network that only includes UEs 115 that support the sub-slot structure. In contrast to the examples of FIGS. 4 and 5, the sub-slot structure of FIG. 3 includes a sub-slot SCI-1 and omits a slot SCI-1.

Figure 4:
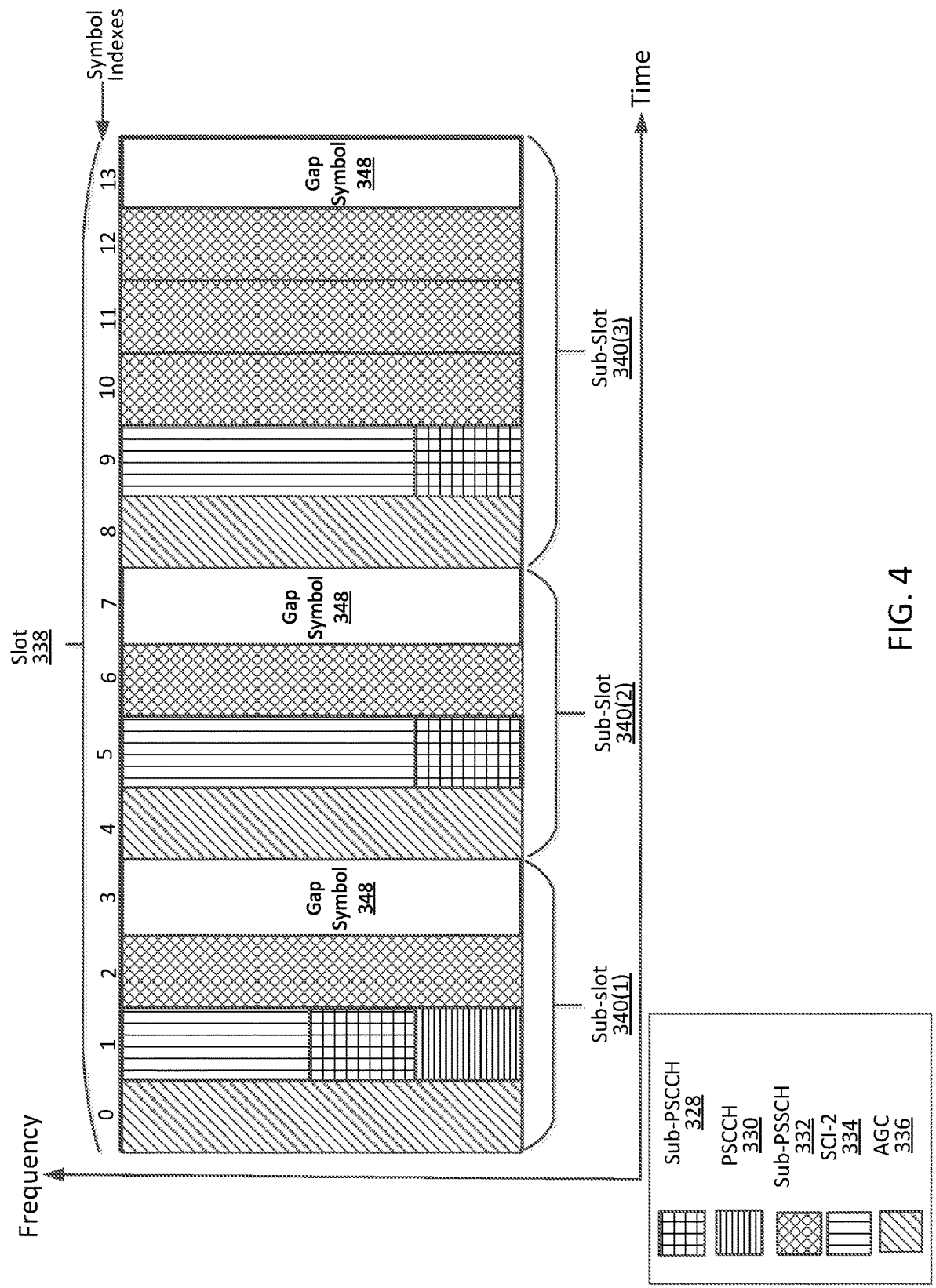

FIG. 4 illustrates a slot 338 partitioned into sub-slots 340 according to some aspects of the present disclosure. In FIG. 4, the x-axis represents time in some arbitrary units and the Y-axis represents frequency in some arbitrary units. The UE (e.g., the UE 115, the UE 800) may map sub-PSSCHs 332, SCIs 334, and AGC symbols 336 to any or all of the sub-slots 340 in a slot 338. In some aspects, the UE 115 may map multiple sub-PSSCHs 332, SCIs 334, and AGC symbols 336 to multiple sub-slots 340 within the slot 338. In some instances, each of the sub-PSSCHs 332, SCIs 334, and AGC symbols 336 mapped in a sub-slot 340 may be used by a different UE 115 to transmit a TB to a different UE 115 over a sidelink channel. In this manner, the transmitting UEs 115 may increase the utilization of time/frequency resources within the slot 338 as compared to a single UE transmitting a TB to a single UE in the slot 338. By partitioning the symbols into multiple sub-slots 340 within the slot 338, each sub-slot 340 may include a different TB destined to a different receiving UE 115.

In some aspects, the network may include a mix of both UEs 115 that support the sub-slot structure and UEs 115 that do not support the sub-slot structure. In contrast to the example of FIG. 3, in which the network includes UEs 115 that only support the sub-slot structure, in the example of FIG. 4, the network may include a mix of UEs that support the slot structure and UEs that support the sub-slot structure. In this case, the UE 115 may include both a slot SCI-1 and a sub-slot SCI-1 in the sub-PSCCH 328 in the leading sub-slot, in contrast to the slot structure of FIG. 3 that includes a sub-slot SCI-1 and omits a slot SCI-1. The slot SCI-1 may be carried in PSCCH 330 in a location such that UEs 115 that do not support the sub-slot structure may receive and understand the slot SCI-1. For example, the slot SCI-1 may be located in a legacy location, such as the first symbol (e.g., symbol index 1) following the AGC symbol 336 in the slot 338. The slot SCI-1 information may include the time and/or frequency resources for the current slot 338 and future reserved slots. The sub-slot SCI-1 may be carried in the sub-PSCCH 328 in the same symbol (e.g., symbol index 1) as the slot SCI-1 but may occupy different frequency resources. For example, the sub-slot SCI-1 may occupy resource elements adjacent to the slot SCI-1. In some aspects, when the slot structure occupies more than one frequency subchannel, the sub-slot SCI-1 may occupy resource elements in the same location as the slot SCI-1 but in a different subchannel. For example, the sub-slot SCI-1 may occupy resource elements in a subchannel adjacent to the subchannel carrying the slot SCI-1. In some aspects, the UE 115 may include a slot SCI-1 in the PSCCH 330 in the leading sub-slot 340(1) and include a sub-slot SCI-1 in the sub-PSCCHs 328 in the remaining sub-slots 340(2) and 340(3) of the slot 338.

Figure 5:
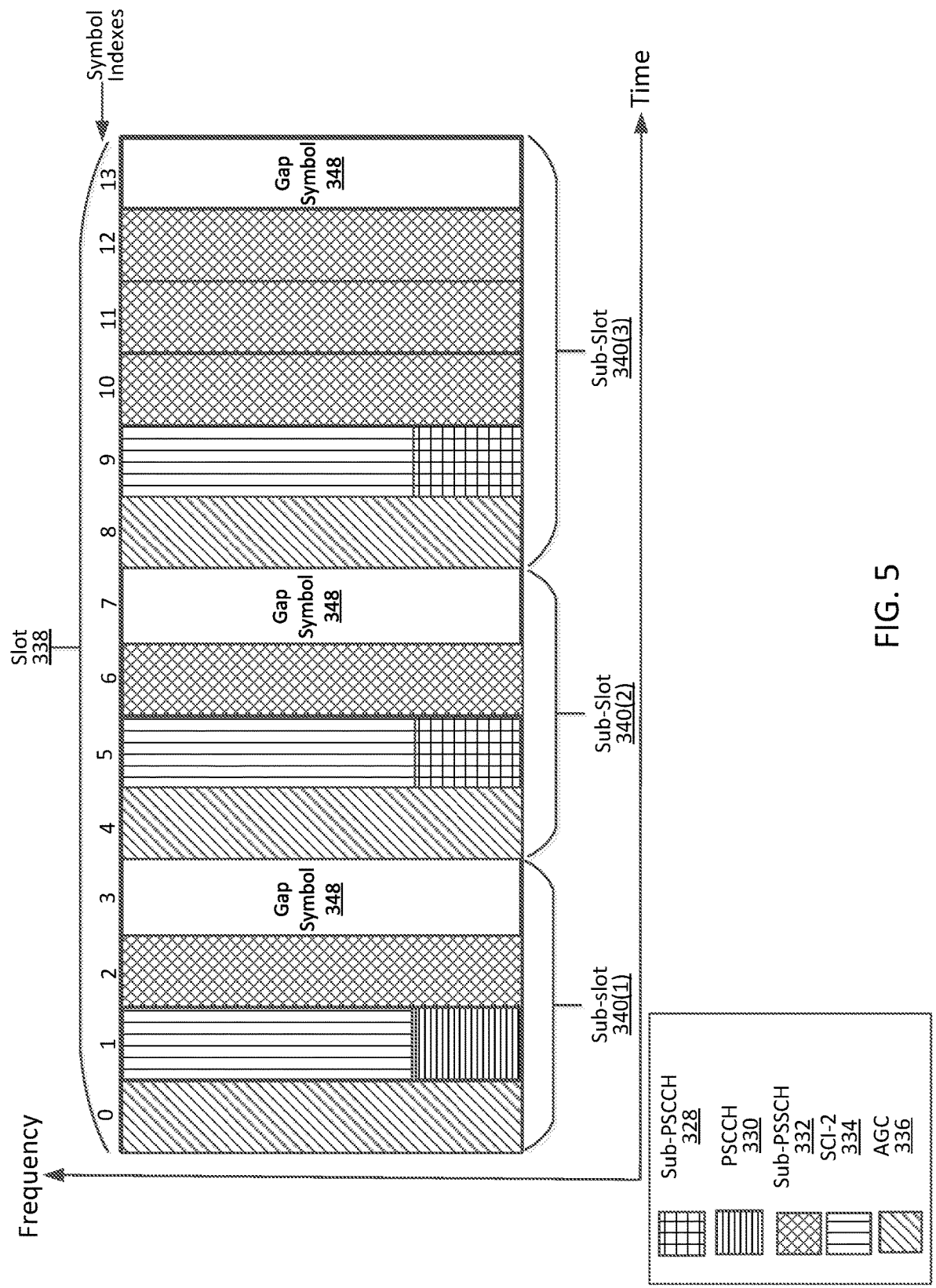

FIG. 5 illustrates a slot 338 partitioned into sub-slots 340 according to some aspects of the present disclosure. In FIG. 5, the x-axis represents time in some arbitrary units and the Y-axis represents frequency in some arbitrary units. The UE (e.g., the UE 115, the UE 800) may map sub-PSSCHs 332, SCIs 334, and AGC symbols 336 to any or all of the sub-slots 340 in a slot 338. In some aspects, the UE 115 may map multiple sub-PSSCHs 332, SCIs 334, and AGC symbols 336 to multiple sub-slots 340 within the slot 338. In some instances, each of the sub-PSSCHs 332, SCIs 334, and AGC symbols 336 mapped in a sub-slot 340 may be used by a different UE 115 to transmit a TB to a different UE 115 over a sidelink channel. In this manner, the transmitting UEs 115 may increase the utilization of time/frequency resources within the slot 338 as compared to a single UE transmitting a TB to a single UE in the slot 338. By partitioning the symbols into multiple sub-slots 340 within the slot 338, each sub-slot 340 may include a different TB destined to a different receiving UE 115.

In some aspects, the network may include a mix of both UEs 115 that support the sub-slot structure and UEs that do not support the sub-slot structure. In contrast to the example of FIG. 3, in which the network includes UEs 115 that only support the sub-slot structure, in the example of FIG. 5, the network may include a mix of UEs that support the slot structure and UEs that support the sub-slot structure. In this case, the UE 115 may include a slot SCI-1 and a sub-slot SCI-1 in the PSCCH 330 in the leading sub-slot, in contrast to the slot structure of FIG. 3 that includes a sub-slot SCI-1 and omits a slot SCI-1. The slot SCI-1 and sub-slot SCI-1 may be carried in the PSCCH 330 in a location such that UEs 115 that do not support the sub-slot structure and UEs 115 that do support the sub-slot structure may receive and understand the slot SCI-1 and the sub-slot SCI-1. For example, the slot SCI-1 and the sub-slot SCI-1 may be located in a legacy location, such as the first symbol (e.g., symbol index 1) following the AGC symbol 336 in the slot 338 in contrast to the example of FIG. 4 in which the slot SCI-1 is located in a legacy location and the sub-slot SCI-1 is located adjacent to the slot SCI-1. The slot SCI-1 and sub-slot SCI-1 information may include the time and/or frequency resources for the current slot 338 and future reserved slots. The sub-slot SCI-1 may include the information related to the sub-slot 340 structure of the slot 338. In some aspects, the UE 115 may include a slot SCI-1 and a sub-slot SCI-1 in the PSCCH 330 in the leading sub-slot 340(1) and include only a sub-slot SCI-1 in the sub-PSCCHs 328 in the remaining sub-slots 340(2) and 340(3) of the slot 338.

Figure 6:
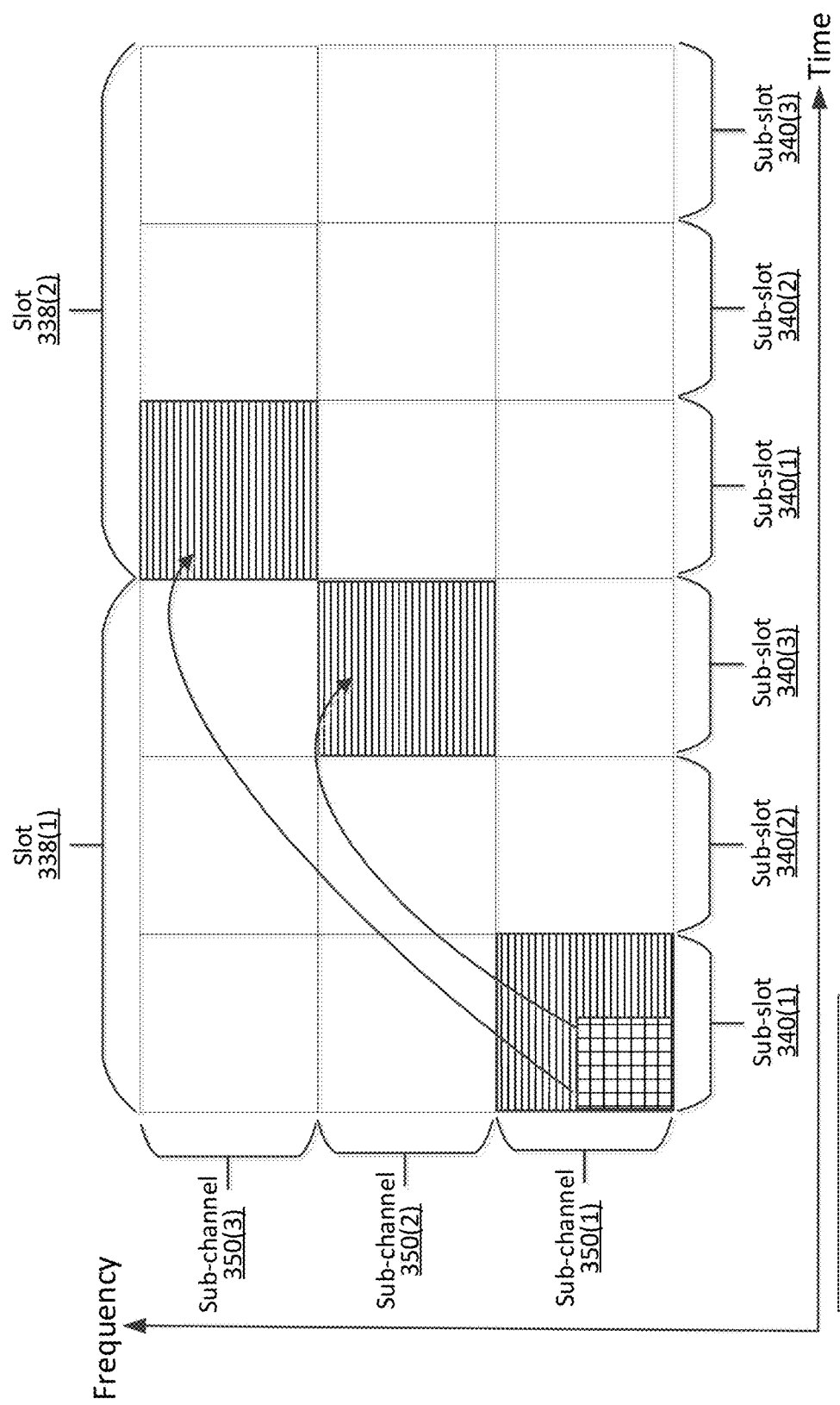
FIG. 6 illustrates resource reservations mapped to sub-slots according to some aspects of the present disclosure.

FIG. 6 illustrates resource reservations mapped to sub-slots 340 according to some aspects of the present disclosure. In FIG. 6, the x-axis represents time in some arbitrary units and the Y-axis represents frequency in some arbitrary units. In some aspects, the UE 115 may operate in sidelink mode 1 and receive a resource pool (RP) configuration from a BS (e.g., the BS 105 or BS 900). The RP configuration may include a sub-slot RP that defines an RP for the plurality of sub-slots 340(1) . . . 340(3) of the first slot 338(1). The RP configuration may also include a slot RP that defines an RP for a second slot 338(2) that is different from the first slot 338(1). The UE 115 may receive the sub-slot RP in a first frequency. The UE 115 may receive the slot RP in a second frequency different from the first frequency. For example, the UE 115 may receive the sub-slot RP in a first subchannel 350(1) and the slot RP in a second subchannel 350(2) different from the first subchannel 350(1). The UE 115 may receive from the BS an indicator that indicates whether the RP configuration includes the sub-slot RP or the slot RP.

The UE 115 may receive an RP configuration from a BS that includes both a sub-slot RP and a slot RP in which at least one resource of the sub-slot RP is common to the slot RP. In other words, some of the resources in the sub-slot RP may overlap with resources in the slot RP. When operating in sidelink mode 1, the UE may receive an indicator from the BS as to whether the UE 115 should use the sub-slot RP or the slot RP. In this regard, the UE 115 may receive the indicator in an RRC message and/or a DCI message (e.g., a DCI-3 signal, DCI-1 signal). In this case, the UE 115 may dynamically switch between using the sub-slot RP or the slot RP on a slot by slot basis. Within any given slot, the UE 115 may use one of the sub-slot RP or the slot RP. For example, the UE 115 may use the sub-slot RP in slot 338(1) and the slot RP in slot 338(2). The UE 115 may operate as a leading UE 115 when receiving an indicator from the BS as to whether the UE 115 should use the sub-slot RP or the slot RP for a particular slot 338. In turn, the leading UE 115 may transmit the indicator in the SCI-1 to the following UEs 115 so that the following UEs 115 know whether use the sub-slot RP or the slot RP for the particular slot 338.

The dynamic switching between using the sub-slot RP or the slot RP for different slots may result in additional power consumption by the following UEs 115. To address this issue, the leading UE 115 may transmit only one of the sub-slot RP or the slot RP for a particular slot 338 and subchannel 350. The leading UE 115 may transmit the SCI-1 in a leading sub-slot 340(1) that includes an indicator that indicates whether the following UEs 115 should monitor for a sub-slot SCI-1 on a sub-slot 340 basis or monitor for a slot SCI-1 on a subchannel 350 basis. If the indicator indicates a sub-slot RP is transmitted, then the following UEs 115 will decode the sub-slot SCI-1 in the sub-slots 340. If the indicator indicates a slot RP is transmitted, then the following UEs 115 will decode one slot SCI-1 per subchannel 350. By decoding either the sub-slot SCI-1 or the slot SCI-1, the following UEs 115 may reduce power consumption.

In some aspects, the UE 115 may transmit a sub-slot SCI-1 that includes time and/or frequency resource reservations for future retransmissions. The time-domain resource reservations may indicate reserved time resources for future sub-slots 340. The resource reservations may be based on a sub-slot 340 granularity. The indicator may be an offset between the sub-slot 340 in which the sub-slot SCI-1 is located and the sub-slot 340 in which the reserved resources are located. The frequency-domain resource reservations may indicate reserved frequency resources for future sub-slots 340. In this regard, the sub-slot SCI-1 may include an indicator that indicates the frequency subchannels 350 that are reserved for future sub-slots 340. For example, referring to FIG. 6, the sub-slot SCI-1 carried in sub-PSCCH 328 located in sub-slot 340(1) and subchannel 350(1) of slot 338(1) may reserve resources in sub-slot 340(3) and subchannel 350(2) of slot 338(1) and sub-slot 340(1) and subchannel 350(3) of slot 338(2).

In some aspects, the leading UE 115 may not have a TB to transmit in the sub-PSSCH 342 of the sub-slot 340(1) but may receive the RP configuration from a BS. In this regard, the UE 115 may receive the RP configuration in an RRC message and/or a DCI message (e.g., a DCI-3 signal, DCI-1 signal). The leading UE 115 may transmit the RP configuration in the SCI-1 carried by the sub-PSCCH 328 to the following UEs 115 in the leading sub-slot 340(1) without transmitting a TB in the sub-PSSCH 342 of the leading sub-slot 340(1). The SCI-1 may indicate to the following UEs 115 which sub-slots 340 and subchannels 350 the following UEs may utilize for transmissions. The SCI-1 may indicate to the UEs 115 that support sub-slots 340 in a slot 338 and UEs 115 that do not support sub-slots 340 within a slot 338 the future reserved resources. However, the UEs 115 that support sub-slots 340 may or may not reserve the resources indicated in the SCI-1. Instead, the UEs 115 that support sub-slots 340 may select resources from within the SCI-1 indicated reserved resources or outside the SCI-1 indicated reserved resources. The UEs 115 that support sub-slots 340 may indicate the selected reserved resources in the sub-slot SCI-1. The selected reserved resources may be indicated with respect to the sub-slot 340(1) in which the sub-slot SCI-1 is transmitted in or with respect to the slots 338 reserved by the SCI-1.

Figure 7:
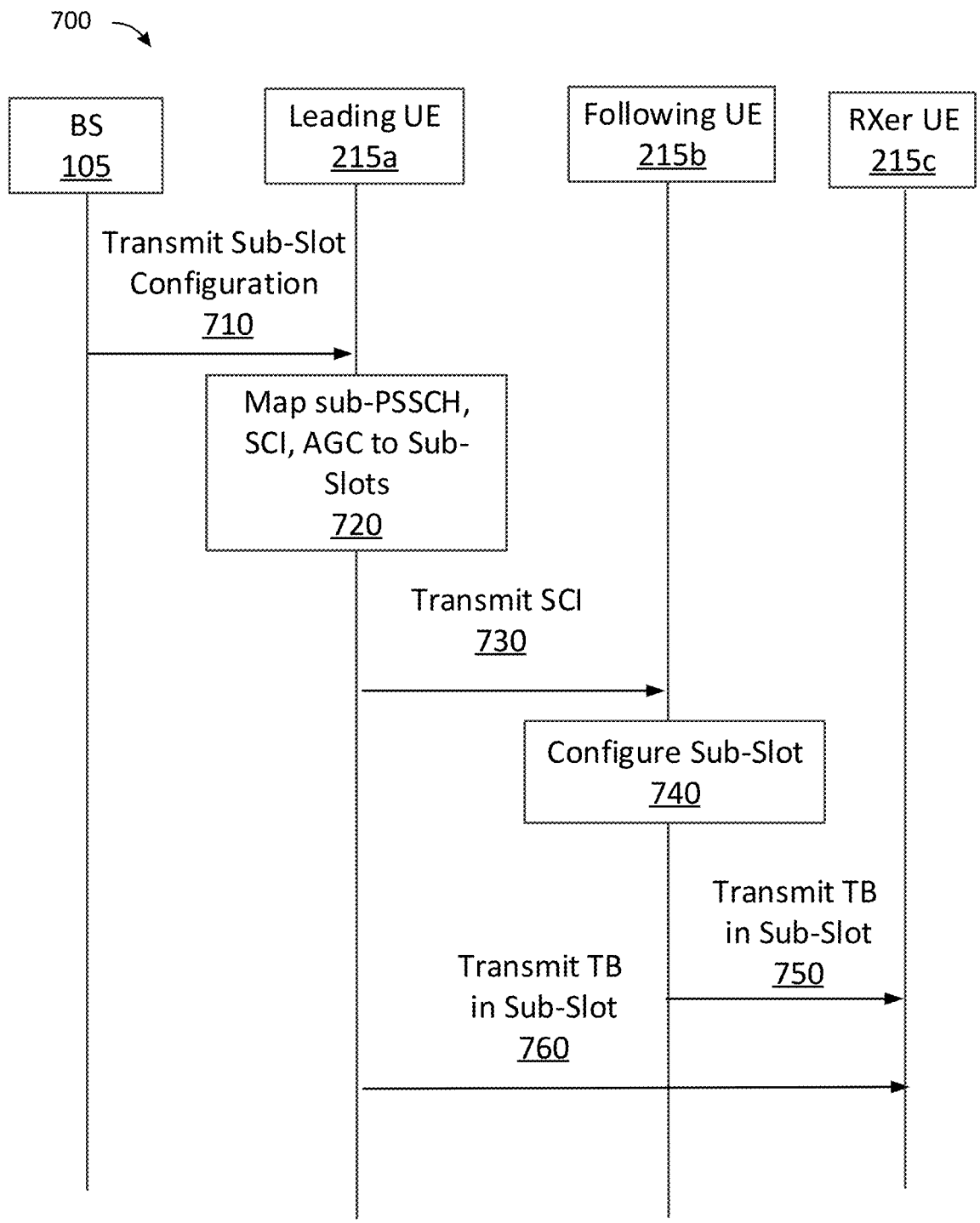
FIG. 7 is a signaling diagram of a communication method according to some aspects of the present disclosure.

FIG. 7 is a signaling diagram 700 of a communication method according to some aspects of the present disclosure. Steps of the signaling diagram 700 can be executed by a computing device (e.g., a processor, processing circuit, and/or other suitable component) of a communication device or other suitable means for performing the steps. For example, a communication device, such as the BS 105 or the BS 900, may utilize one or more components, such as a processor 902, a memory 904, instructions 906, a sub-slot mapping module 908, a transceiver 910, a modem 912, an RF unit 914, and one or more antennas 916 to execute the steps of method signaling diagram 700. A wireless communication device, such as the UE 115 or UE 800, may utilize one or more components, such as the processor 802, the memory 804, the sub-slot mapping module 808, the transceiver 810, the modem 812, and the one or more antennas 816, to execute signaling diagram 700.

At 710, a BS 105 may transmit a sub-slot configuration to a leading UE 115a. In this regard, the BS 105 may transmit the sub-slot configuration in an RRC configuration message, a DCI message, and/or a MAC control element signaling via a physical downlink shared channel (PDSCH), a physical downlink control channel (PDCCH), or other suitable channel to the leading UE 115a. At 720, the leading UE 115a may receive the sub-slot configuration and map sub-PSSCHs, SCIs, and AGC symbols to sub-slots of a plurality of sub-slots of a slot. The leading UE 115a may map the sub-PSSCHs, SCIs, and AGC symbols according to the methods described above with reference to FIGS. 2-6. At 730 the leading UE 115a may transmit the sub-slot configuration to following UE 115b. The sub-slot configuration may include, without limitation, a number of the sub-slots within the slot, a starting position of each sub-slot within the slot, a duration of each sub-slot within the slot, and an RP configuration. In this regard, the leading UE 115a may transmit the sub-slot configuration to following UE 115b using the methods described above with reference to FIGS. 2-6. At 740, the following UE may configure a sub-slot of the slot for transmitting a TB to the receiving UE 115c. The following UE may configure the sub-slot based on the sub-slot configuration and RP configuration received from the leading UE 115a. For example, the following UE 115b may configure a sub-slot (e.g., sub-slot 340(2)) following the leading sub-slot (e.g., sub-slot 340(1)) with a sub-PSSCH, SCI, AGC symbol and gap symbol. At 750, the following UE 115b may transmit a TB to the receiving UE 115c in a sub-PSSCH of the sub-slot. At 760, the leading UE 115a may also transmit a TB to receiving UE 115c in a sub-slot different from the sub-slot the following UE 115b used to transmit a TB. For example, the leading UE 115a may transmit a TB to receiving UE 115c in a leading sub-slot (e.g., sub-slot 340(1)).

Figure 8:
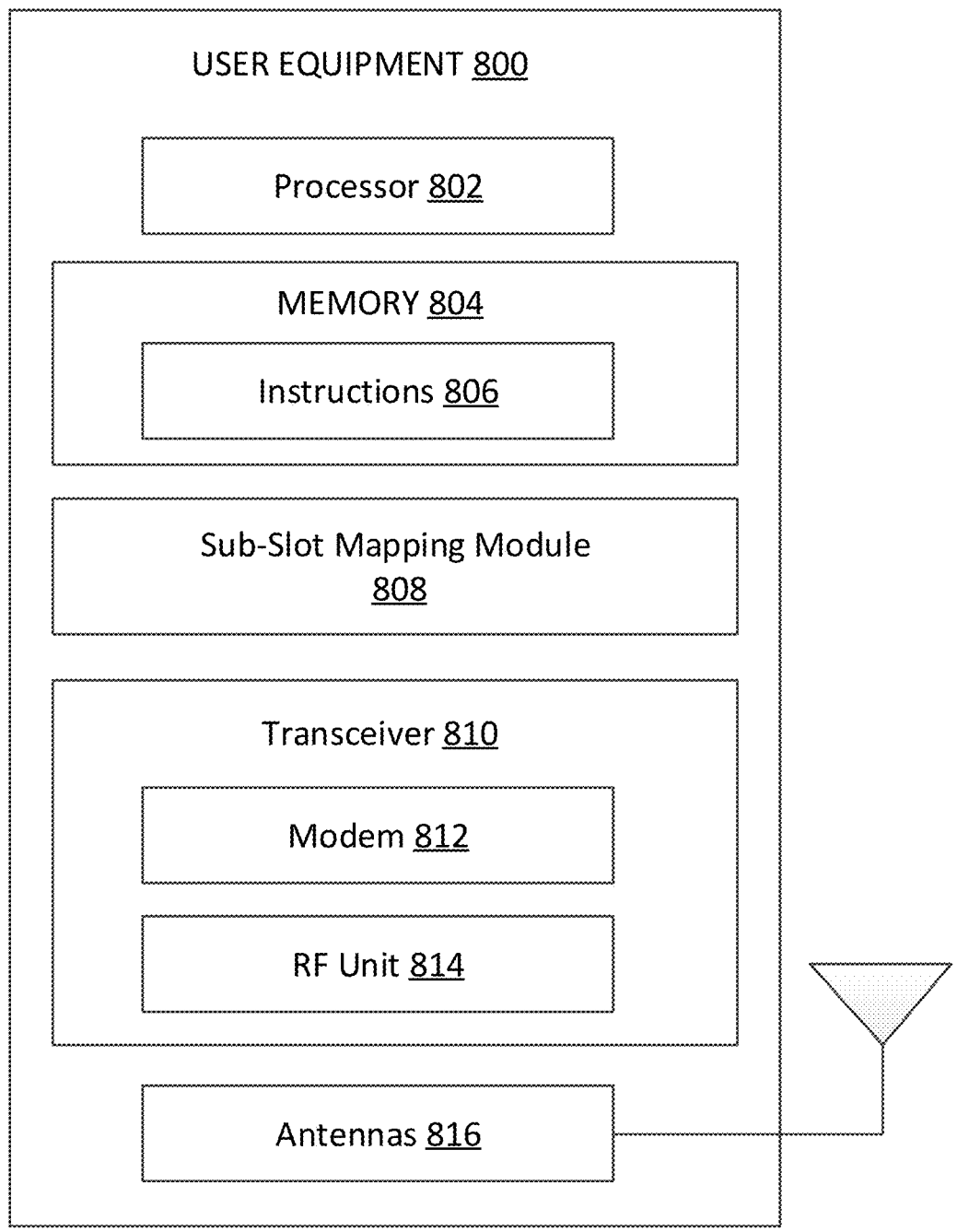
FIG. 8 is a block diagram of an exemplary user equipment (UE) according to some aspects of the present disclosure.

FIG. 8 is a block diagram of an exemplary UE 800 according to some aspects of the present disclosure. The UE 800 may be the UE 115 in the network 100 as discussed above. As shown, the UE 800 may include a processor 802, a memory 804, a sub-slot mapping module 808, a transceiver 810 including a modem subsystem 812 and a radio frequency (RF) unit 814, and one or more antennas 816. These elements may be coupled with each other and in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 804 includes a non-transitory computer-readable medium. The memory 804 may store instructions 806. The instructions 806 may include instructions that, when executed by the processor 802, cause the processor 802 to perform the operations described herein with reference to the UEs 115 in connection with aspects of the present disclosure, for example, aspects of FIGS. 2-7 and 10-11. Instructions 806 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sub-slot mapping module 808 may be implemented via hardware, software, or combinations thereof. For example, the sub-slot mapping module 808 may be implemented as a processor, circuit, and/or instructions 806 stored in the memory 804 and executed by the processor 802.

The sub-slot mapping module 808 may be used for various aspects of the present disclosure, for example, aspects of FIGS. 2-7 and 10-11. The sub-slot mapping module 808 is configured to map a sub-physical sidelink shared channel (sub-PSSCH), sidelink control information (SCI), and an automatic gain control (AGC) symbol to a sub-slot of a plurality of sub-slots of a slot. The sub-slot mapping module 808 may be used to transmit, to at least one other UE, a transport block via the sub-slot of the slot. In this regard, the processor 802 may execute instructions 806 to map a sub-PSSCH, SCI, and an AGC symbol to a sub-slot of a plurality of sub-slots of a slot. The transceiver 810 may transmit the TBs via a sub-PSSCH to other UEs. The transceiver 810 may also be configured to transmit to at least one other UE, an RP configuration, a demodulation reference signal, SCI-1, sub-slot SCI-1, and/or SCI-2 via a sub-PSSCH of the sub-slot.

As shown, the transceiver 810 may include the modem subsystem 812 and the RF unit 814. The transceiver 810 can be configured to communicate bi-directionally with other devices, such as the BSs 105 and/or the UEs 115. The modem subsystem 812 may be configured to modulate and/or encode the data from the memory 804 and the sub-slot mapping module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The antennas 816 may include multiple antennas of similar or different designs in order to sustain multiple transmission links. The RF unit 814 may configure the antennas 816.

In some instances, the UE 800 can include multiple transceivers 810 implementing different RATs (e.g., NR and LTE). In some instances, the UE 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the sub-slot mapping module 808, and/or the transceiver 810. The processor 802 and may execute operating system (OS) code stored in the memory 804 in order to control and/or coordinate operations of the sub-slot mapping module 808 and/or the transceiver 810. In some aspects, the processor 802 may be implemented as part of the sub-slot mapping module 808. In some aspects, the processor 802 is configured to transmit via the transceiver 810, to another UE, TBs in sub-PSSCHs of sub-slots.

Figure 9:
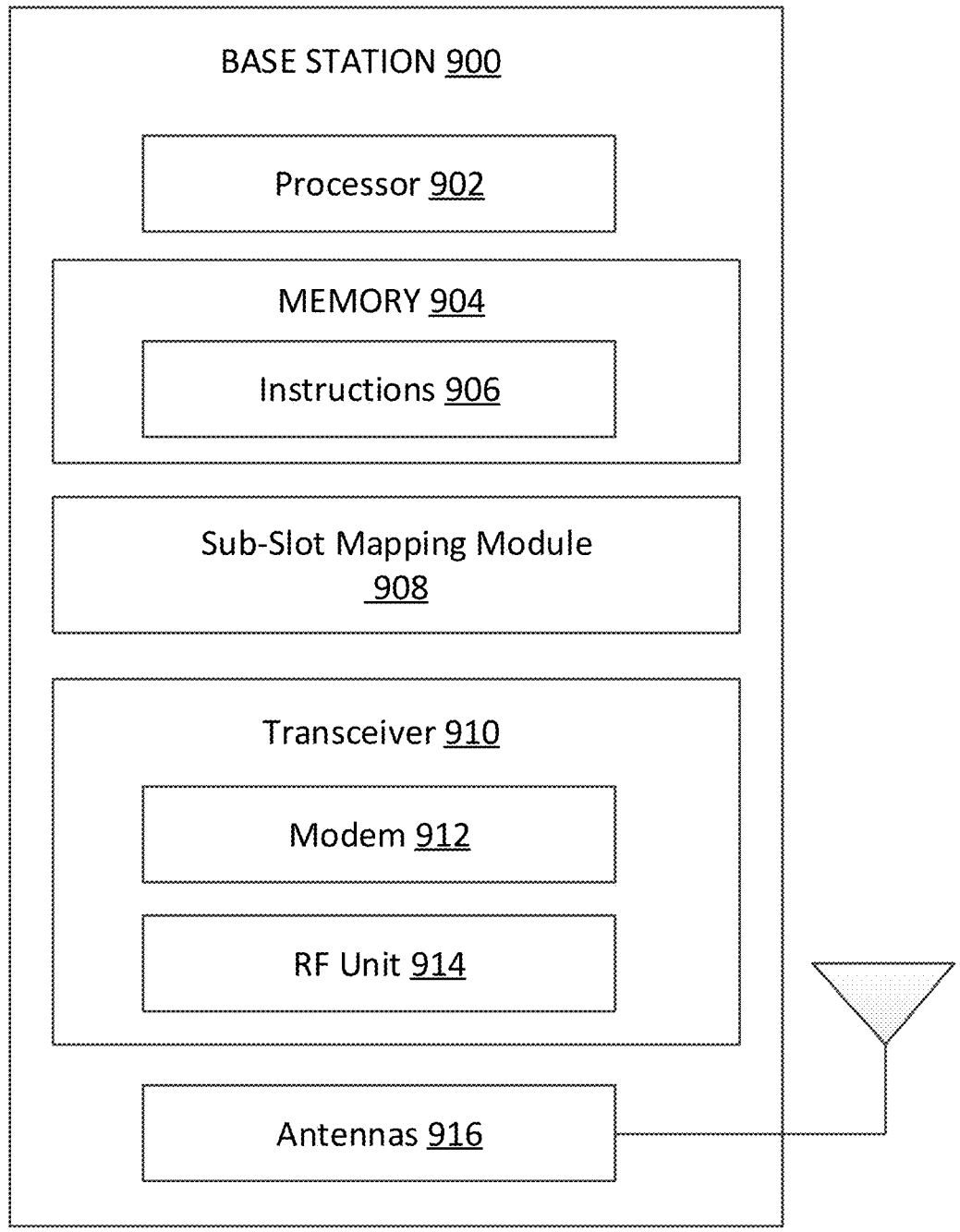
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 as discussed above. As shown, the BS 900 may include a processor 902, a memory 904, a sub-slot mapping module 908, a transceiver 910 including a modem subsystem 912 and a RF unit 914, and one or more antennas 916. These elements may be coupled with each other and in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-7 and 10-11. Instructions 906 may also be referred to as code, which may be interpreted broadly to include any type of computer-readable statement(s).

The sub-slot mapping module 908 may be implemented via hardware, software, or combinations thereof. For example, the sub-slot mapping module 908 may be implemented as a processor, circuit, and/or instructions 906 stored in the memory 904 and executed by the processor 902.

The sub-slot mapping module 908 may be used for various aspects of the present disclosure, for example, aspects of FIGS. 2-7 and 10-11. The sub-slot mapping module 908 is configured to transmit, to a UE (e.g., the UE 115, the UE 800), a configuration indicating a plurality of sub-slots within a slot, wherein the configuration comprises a number of the sub-slots within the slot; a starting position of each sub-slot within the slot; and a duration of each sub-slot within the slot. In this regard, the transceiver 910 may transmit to a UE (e.g., the UE 115, the UE 800), the configuration indicating a plurality of sub-slots within a slot in an RRC message and/or a DCI message (e.g., a DCI-3 signal, DCI-1 signal) carried in a PDSCH. transmitting, to the UE, an indicator indicating an assignment as a leading UE. In some aspects, the sub-slot mapping module 908 may be used to transmit, to the UE, a resource pool (RP) configuration. The sub-slot mapping module 908 may be used to transmit the RP configuration including a sub-slot RP in a first frequency and a slot RP in a second frequency different from the first frequency. The sub-slot mapping module 908 may be used select a UE or multiple UEs as leading UEs within the network. In this regard, the transceiver 910 may transmit, to the UE(s), an indicator indicating an assignment as a leading UE.

Additionally or alternatively, the sub-slot mapping module 908 can be implemented in any combination of hardware and software, and may, in some implementations, involve, for example, processor 902, memory 904, instructions 906, transceiver 910, and/or modem 912.

As shown, the transceiver 910 may include the modem subsystem 912 and the RF unit 914. The transceiver 910 can be configured to communicate bi-directionally with other devices, such as the UEs 115 and/or 800. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 900 to enable the BS 900 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, a configuration indicating a plurality of sub-slots within a slot according to aspects of the present disclosure. The antennas 916 may further receive data messages transmitted from other devices and provide the received data messages for processing and/or demodulation at the transceiver 910. The antennas 916 may include multiple antennas of similar or different designs in order to sustain multiple transmission links.

In some instances, the BS 900 can include multiple transceivers 910 implementing different RATs (e.g., NR and LTE). In some instances, the BS 900 can include a single transceiver 910 implementing multiple RATs (e.g., NR and LTE). In some instances, the transceiver 910 can include various components, where different combinations of components can implement RATs.

In some aspects, the processor 902 may be coupled to the memory 904, the sub-slot mapping module 908, and/or the transceiver 910. The processor 902 may execute OS code stored in the memory 904 to control and/or coordinate operations of the sub-slot mapping module 908, and/or the transceiver 910. In some aspects, the processor 902 may be implemented as part of the sub-slot mapping module 908. In some aspects, the processor 902 is configured to transmit via the transceiver 910, to a UE, an indicator indicating a configuration of sub-slots within a slot.

Figure 10:
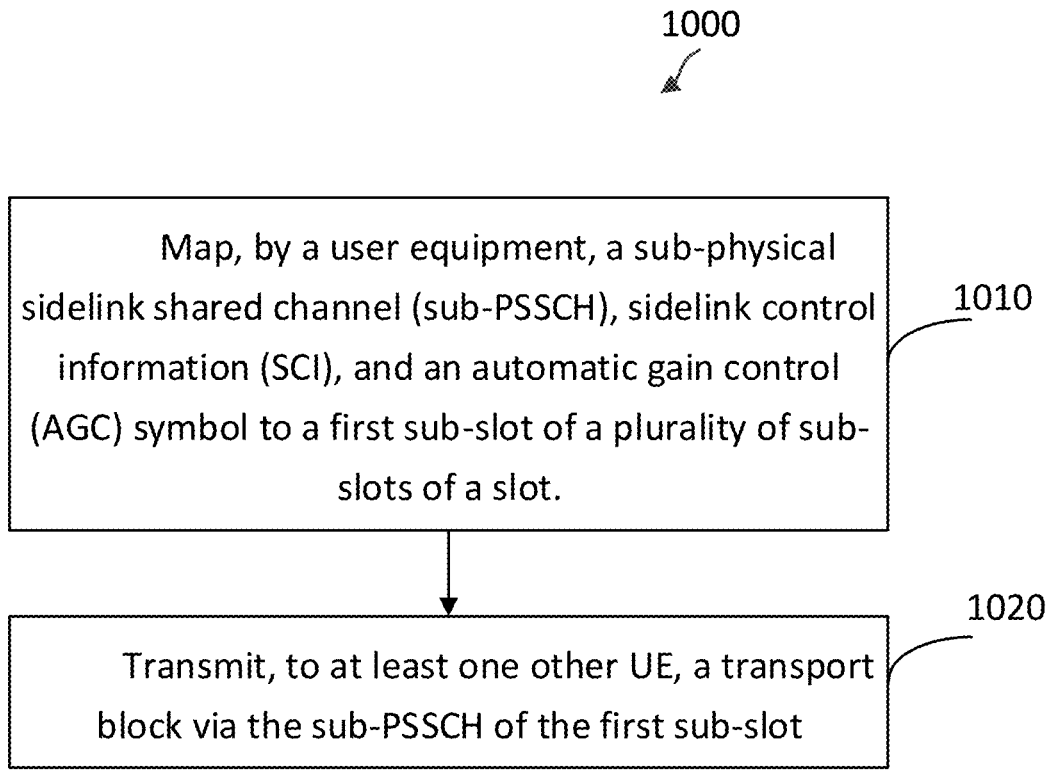
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115 or UE 800, may utilize one or more components, such as the processor 802, the memory 804, the sub-slot mapping module 808, the transceiver 810, the modem 812, and the one or more antennas 816, to execute aspects of method 1000. The method 1000 may employ similar mechanisms as in the networks 100 and 200 and the aspects and actions described with respect to FIGS. 2-7. As illustrated, the method 1000 includes a number of enumerated steps, but the method 1000 may include additional steps before, after, and in between the enumerated steps. In some aspects, one or more of the enumerated steps may be omitted or performed in a different order.

At 1010, the method 1000 includes a UE (e.g., the UE 115 or the UE 800) mapping a sub-physical sidelink shared channel (sub-PSSCH), sidelink control information (SCI), and an automatic gain control (AGC) symbol to a sub-slot of a plurality of sub-slots of a slot. In some aspects, the UE may map a sub-PSSCH, an SCI, and an AGC symbol to each sub-slot of a plurality of sub-slots within the slot. In some aspects, each sub-slot may be used by a different UE to transmit a transport block (TB) over the associated sub-PSSCH. In this manner, the UEs may increase the utilization of time and/or frequency resources within a slot as compared to only a single UE transmitting in a slot.

In some aspects, the UE may partition a slot into a plurality of sub-slots. By partitioning the slot into the plurality of sub-slots, each sub-slot may utilized by a different UE to transmit a TB, facilitating the transmission of multiple TBs by multiple UEs in a single slot. In some instances, the UE may be a leading UE that receives a sub-slot partitioning configuration from a BS (e.g., BS 105 or BS 900). The UE may receive a resource pool (RP) configuration from the BS that defines the RP for the sub-slots. In this regard, the UE may receive the sub-slot and/or RP configurations in an RRC message and/or a DCI message (e.g., a DCI-3 signal, DCI-1 signal). The leading UE may partition the slot into a plurality of sub-slots based on the sub-slot configuration and/or the RP configuration. The leading UE may transmit the sub-slot structure to the following UEs. In some instances, the UE communicates the sub-slot structure to the following UEs in SCI. In some aspects, the leading UE may transmit a TB in a leading sub-slot (e.g., the earliest sub-slot in time) of the plurality of sub-slots defined for the slot). The UE may transmit the SCI with the sub-slot structure to the following UEs in the leading sub-slot. The leading UE may assign each of the following UEs a particular sub-slot of the plurality of sub-slots in which the following UE may transmit a TB. In some instances, the UE indicates the assignment of the following UEs to the sub-slots in the sub-slot structure communicated to the following UEs in the SCI.

In some aspects, the UE partitions the slot such that each sub-slot occupies multiple symbols within the slot. For example, a slot may include 2, 3, 4, or more sub-slots. In some instances, a slot may include 14 symbols. A sub-slot may occupy 2, 3, 4, 5, 6, or more symbols. In some aspects, each sub-slot may occupy contiguous symbols within the slot. In this regard, each sub-slot may occupy groups of symbols that are contiguous in time. The group of contiguous symbols may include any number of symbols contained within the slot. In some aspects, the sub-slots may occupy symbol indexes 0-3, 4-7, 8-12, or any other group of contiguous symbols within the slot. The number of symbols occupying the sub-slot may be based on the size of the TB to be transmitted. A larger TB may require more symbols than a smaller TB.

In some aspects, the UE may map an AGC symbol to each sub-slot of the slot. In some aspects, the UE mapping the AGC symbol to the sub-slot of the plurality of sub-slots of the slot may be part of the UE mapping an AGC symbol to each sub-slot of the plurality of slots of the slot. A following UE may receive a transport block from the leading UE in a sub-PSSCH whose signal strength may vary over a wide dynamic range depending on channel attenuation and interference. The AGC symbol may be used to adjust the strength of the received signal in order to reduce the quantization error at the analog to digital converter of the UE. In some instances, the AGC symbol may help a UE's receiver adjust the gain of a front-end amplifier. In some aspects, the UE may map the AGC symbol to the leading (e.g., the earliest) symbol in the sub-slot. The UE may map the AGC symbol to the leading symbol in order for a receiving UE to properly set the gain of the amplifier and successfully decode the subsequent symbols of the sub-slot.

In some aspects, the UE may map a sub-PSSCH to each sub-slot of the slot. In some aspects, the UE mapping the sub-PSSCH to the sub-slot of the plurality of sub-slots of the slot may be part of the UE mapping a sub-PSSCH to each sub-slot of the plurality of slots of the slot. Each sub-PSSCH of each sub-slot may occupy one or more symbols. The sub-PSSCHs may carry one or more transport blocks (TBs) that include the data to be communicated by a transmitting UE. As described above, in accordance with the present disclosure each sub-slot may be utilized by a different UE to transmit the TB(s).

In some aspects, the UE may map a gap symbol (e.g., a guard period) to each sub-slot of the slot. The gap symbol of each sub-slot may occupy a full symbol. In some instances, the UE may map the gap symbol to an ending symbol of the sub-slot. The gap symbol may be used for timing adjustments and/or for allowing UEs to switch between transmission and reception.

In some aspects, the UE may map an SCI to each sub-slot of the slot. In some aspects, the UE mapping the SCI to the sub-slot of the plurality of sub-slots of the slot may be part of the UE mapping the SCI to each sub-slot of the plurality of slots of the slot. The SCI may include a first-stage SCI-1 and/or a second-stage SCI-2. Splitting the SCI in two stages (first-stage SCI-1 and second-stage SCI-2) may allow UEs to decode the first-stage SCI-1 for channel sensing purposes, such as determining the resources reserved by other transmissions. The second-stage SCI-2 may provide additional control information that allows the UE to receive and decode a transmission. In this regard, the UE may transmit the SCI-1 to another UE in a physical sidelink control channel (PSCCH). The SCI-1 may include a beta offset associated with an SCI-2. The SCI-1 may include a modulation and encoding scheme (MCS) of the sub-PSSCH. The SCI-1 may include resource assignments for at least one sub-slot of the plurality of sub-slots of a slot and/or resource assignments for at least one sub-slot of another slot (e.g. a future slot). The resource assignments for the current slot or for a future slot may be used by transmitting UE(s) for retransmissions of TB(s) that are not successfully decoded by receiving UE(s). The UEs may be operating in a sidelink mode 1 in which the leading UE receives the resource assignments from a serving BS. The leading UE may transmit the resource assignments to the following UEs in the SCI-1.

In some aspects, the UE may transmit the SCI-2 to another UE in a sub-PSSCH. The SCI-2 may include information used for decoding the sub-PSSCH and for supporting HARQ feedback. The SCI-2 may include a UE source ID and a UE destination ID associated with a TB. The SCI-2 may also include a one-bit new data indicator (NDI) that is used to specify whether the TB sent in the sub-PSSCH corresponds to the transmission of new data or a retransmission.

In some aspects, the UE may transmit a sub-PSSCH in a sub-slot that includes at least one demodulation reference signal (DMRS). A DMRS may be a reference signal used by the receiving UE(s) for channel estimation and/or compensating for Doppler effects at high UE speeds. The DMRS may be included in each sub-slot of the plurality of sub-slots of a slot. In this regard, the DMRS may be located anywhere within the sub-slot. For example, the DMRS may be located in the first symbol of the sub-slot, the last symbol of the sub-slot, or an intermediate symbol of the sub-slot. In some aspects, the DMRS may include all REs within the symbol. In some aspects, the DMRS may include a portion of the REs within the symbol.

In some aspects, the UE may partition a slot into multiple sub-slots. Each of the multiple sub-slots may be used by a different UE to transmit a TB. Each of the sub-slots may include a structure similar to a slot structure. For example, each sub-slot may include an AGC symbol, a PSCCH (e.g., carrying an SCI-1), a sub-PSSCH (e.g., carrying data, an SCI-2, and/or DMRS), and/or a gap symbol. Some UEs may support both the slot structure and the sub-slot structure. Some UEs may support only the sub-slot structure. Some UEs may support only the slot structure. The SCI-1 may include a sub-slot SCI-1 and/or a slot SCI-1. In some aspects, the sub-slot SCI-1 may be understood only by those UEs that support the sub-slot structure. In some instances, the UE may also map a PSCCH to the sub-slot of the plurality of sub-slots of the slot. In some instances, the sub-slot is a leading sub-slot (i.e., the earliest sub-slot in time) of the plurality of sub-slots. The UE may transmit a sub-slot SCI-1 via the PSCCH to the other UEs while refraining from transmitting a slot SCI-1 when the other UEs support the sub-slot structure. For example, the network may be a so called "greenfield" network that only includes UEs that support the sub-slot structure. By supporting the sub-slot structure, the other UEs may be able to decode and understand the contents of the sub-slot SCI-1 such that a slot SCI-1 can be omitted.

In some aspects, the network may include a mix of both UEs that support the sub-slot structure and UEs that do not support the sub-slot structure. In this case, the UE may include both an SCI-1 and a sub-slot SCI-1 in the sub-PSCCH in the leading sub-slot. The SCI-1 may be located such that UEs that do not support the sub-slot structure may receive and understand the SCI-1. For example, the SCI-1 may be located in a legacy location, such as the first symbol following the AGC symbol in the slot. The SCI-1 information may include the time and/or frequency resources for the current slot and future reserved slots. The sub-slot SCI-1 may be located in the same symbol as the SCI-1 but may occupy different frequency resources. For example, the sub-slot SCI-1 may occupy resource elements adjacent to the SCI-1. In some aspects, when the slot structure occupies more than one frequency subchannel, the sub-slot SCI-1 may occupy resource elements in the same location as the SCI-1 but in a different subchannel. For example, the sub-slot SCI-1 may occupy resource elements in a subchannel adjacent to the subchannel carrying the SCI-1.

In some aspects, the UE may include an SCI-1 in the sub-PSCCH in the leading sub-slot and include a sub-slot SCI-1 in the sub-PSCCHs in the remaining sub-slots of the slot. The SCI-1 may indicate the MCS, beta offset, and future reserved sub-slots.

In some aspects, the UE may receive a resource pool (RP) configuration from a BS (e.g., the BS 105 or BS 900). The RP configuration may include a sub-slot RP that defines an RP for the plurality of sub-slots of the first slot. The RP configuration may also include a slot RP that defines an RP for a second slot that is different from the first slot. The UE may receive the sub-slot RP in a first frequency. The UE may receive the slot RP in a second frequency different from the first frequency. For example, the UE may receive the sub-slot RP in a first subchannel and the slot RP in a second subchannel different from the first sub-channel. The UE may receive from the BS an indicator that indicates whether the RP configuration includes the sub-slot RP or the slot RP.

The UE may receive an RP configuration from a BS that includes both a sub-slot RP and a slot RP in which at least one resource of the sub-slot RP is common to the slot RP. In other words, some of the resources in the sub-slot RP may overlap with resources in the slot RP. When operating in sidelink mode 1, the UE may receive an indicator from the BS as to whether the UE should use the sub-slot RP or the slot RP. In this regard, the UE may receive the indicator in an RRC message and/or a DCI message (e.g., a DCI-3 signal, DCI-1 signal). In this case, the UE may dynamically switch between using the sub-slot RP or the slot RP on a slot by slot basis. Within any given slot, the UE may use one of the sub-slot RP or the slot RP. The UE may operate as a leading UE when receiving an indicator from the BS as to whether the UE should use the sub-slot RP or the slot RP for a particular slot. In turn, the leading UE may transmit the indicator in the SCI-1 to the following UEs so that the following UEs know whether use the sub-slot RP or the slot RP for the particular slot.

The dynamic switching between using the sub-slot RP or the slot RP for different slots may result in additional power consumption by the following UEs. To address this issue, the leading UE may transmit only one of the sub-slot RP or the slot RP for a particular slot and subchannel. The leading UE may transmit the SCI-1 in a leading sub-slot that includes an indicator that indicates whether the following UEs should monitor for a sub-slot SCI-1 on a sub-slot basis or monitor for an SCI-1 on a subchannel basis. If the indicator indicates a sub-slot RP is transmitted, then the following UEs will decode the sub-SCI-1 in the sub-slots. If the indicator indicates a slot RP is transmitted, then the following UEs will decode one SCI-1 per subchannel. By decoding either the sub-slot SCI-1 or the SCI-1, the following UEs may reduce power consumption.

In some aspects, the UE may transmit a sub-slot SCI-1 that includes time and/or frequency resource reservations for future retransmissions. The time-domain resource reservations may indicate reserved time resources for future sub-slots. The resource reservations may be based on a sub-slot granularity. The indicator may be an offset between the sub-slot in which the sub-slot SCI-1 is located and the sub-slot in which the reserved resources are located. The frequency-domain resource reservations may indicate reserved frequency resources for future sub-slots. In this regard, the sub-slot SCI-1 may include an indicator that indicates the frequency subchannels that are reserved for future sub-slots.

In some aspects, the leading UE may not have a TB to transmit in the sub-PSSCH of the sub-slot, but may receive the RP configuration from a BS. In this regard, the UE may receive the RP configuration in an RRC message and/or a DCI message (e.g., a DCI-3 signal, DCI-1 signal). The leading UE may transmit the RP configuration in the SCI-1 to the following UEs in the leading sub-slot without transmitting a TB in the sub-PSSCH of the leading sub-slot. The SCI-1 may indicate to the following UEs which sub-slots and subchannels that the following UEs may utilize for transmissions. The SCI-1 may indicate to the UEs that support sub-slots in a slot and UEs that do not support sub-slots within a slot the future reserved resources. However, the UEs that support sub-slots may or may not reserve the resources indicated in the SCI-1. The UEs that support sub-slots may select resources from within the SCI-1 indicated reserved resources or outside the SCI-1 indicated reserved resources. The UEs that support sub-slots may indicate the selected reserved resources in the sub-slot SCI-1. The selected reserved resources may be indicated with respect to the sub-slot in which the sub-slot SCI-1 is transmitted in or with respect to the slots reserved by the SCI-1.

At 1020, the method 1000 includes the UE transmitting, to at least one other UE, the TB via the sub-PSSCH of the first sub-slot. In some aspects, the UE may "share" the slot with other UEs by partitioning the slot into sub-slots and transmitting a TB in the first sub-slot. Each of the other sub-slots may be used by a different UE to transmit a TB. In this regard, the UE may increase the utilization of resources in the slot and reduce transmission latency compared to transmitting a TB using the entire slot.

Figure 11:
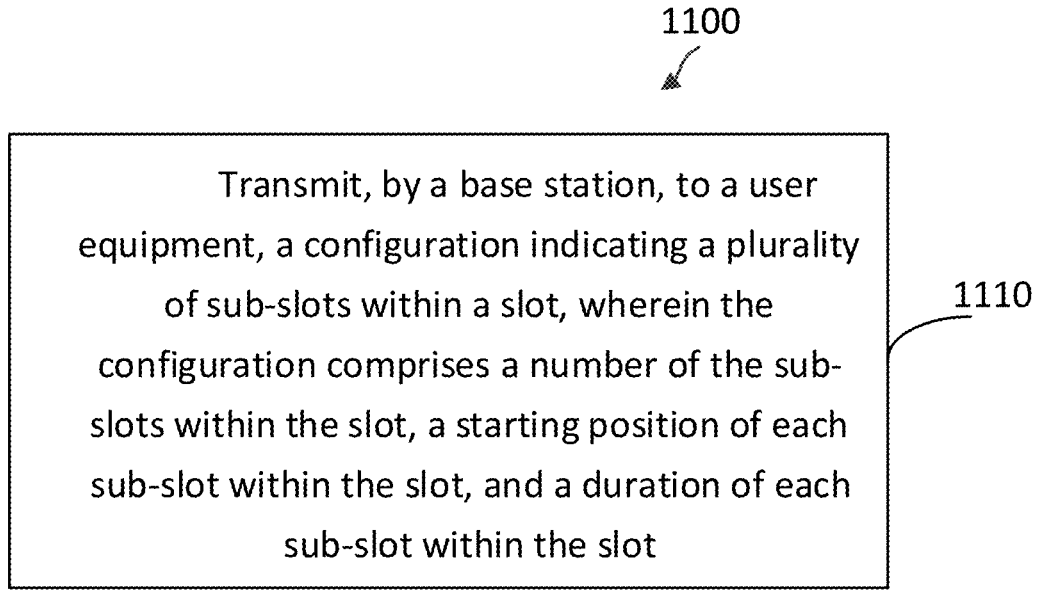
FIG. 11 is a flow diagram of a communication method according to some aspects of the present disclosure.

FIG. 11 is a flow diagram of a communication method 1100 performed by a BS according to some aspects of the present disclosure. Steps of the method 1100 can be executed by a computing device (e.g., a processor, processing circuit, and/or other suitable component) of a communication device or other suitable means for performing the steps. For example, a communication device, such as the BS 105 or the BS 900, may utilize one or more components, such as a processor 902, a memory 904, instructions 906, a sub-slot mapping module 908, a transceiver 910, a modem 912, an RF unit 914, and one or more antennas 916 to execute the steps of method 1100. The method 1100 may employ similar mechanisms as in the networks 100 and 200 and the methods described with respect to FIGS. 2-7. As illustrated, the method 1100 includes a number of enumerated steps, but the method 1100 may include additional steps before, after, and in between the enumerated steps. In some aspects, one or more of the enumerated steps may be omitted or performed in a different order.

At step 1110, the method 1100 of wireless communication performed by a BS (e.g., the BS 105 or the BS 900) includes transmitting, to a user equipment (UE), a configuration indicating a plurality of sub-slots within a slot. The configuration may include the number of sub-slots within the slot; a starting position of each sub-slot within the slot; and a duration of each sub-slot within the slot. In this regard, the BS may transmit the configuration in an RRC message and/or a DCI message (e.g., a DCI-3 signal, DCI-1 signal).

In some aspects, the slot may include any number of sub-slots. For example, the slot may include 2, 3, 4, or more sub-slots. Each of the sub-slots may occupy multiple symbols within the slot. The duration of each sub-slot may be based on the number of symbols the sub-slot occupies. For example, a slot may include 14 symbols. A sub-slot may occupy 2, 3, 4, 5, 6, or more symbols. In some aspects, each sub-slot may occupy contiguous symbols within the slot. In this regard, each sub-slot may occupy groups of symbols that are contiguous in time. The group of contiguous symbols may include any number of symbols contained within the slot. The starting position of each sub-slot within the slot may be based on the symbol index of the starting symbol of the sub-slot. In some aspects, the sub-slots may occupy symbol indexes 0-3, 4-7, 8-12, or any other group of contiguous symbols within the slot. The number of symbols occupying the sub-slot may be based on the size of the TB to be transmitted. A larger TB may require more symbols than a smaller TB.

In some aspects, the BS (e.g., BS 105 or BS 900) may transmit, to the UE, an indicator indicating an assignment as a leading UE. The leading UE may partition a slot into a plurality of sub-slots such that different UEs may transmit TBs in the sub-slots. The BS may select the leading UE based on any criteria. In this regard, the BS may select the leading UE based on a coverage area of the wireless network. In some aspects, the BS may select multiple UEs to be leading UEs. In this regard the BS may select UEs that are spatially separated such that the selected leading UEs may be positioned to transmit sub-slot structure information (e.g., SCI-1, SCI-2, sub-slot SCI-1, RPs, etc.) to following UEs. The BS may transmit an indicator indicating an assignment as a leading UE to the selected UEs.

In some aspects, the BS may transmit, to the UE, a resource pool (RP) configuration. In this regard, the BS may transmit the configuration in an RRC message and/or a DCI message (e.g., a DCI-3 signal, DCI-1 signal). The RP configuration may include a sub-slot RP that defines an RP for sub-slots of a first slot. The RP configuration may also include a slot RP that defines an RP for a second slot that is different from the first slot. The BS may transmit the sub-slot RP in a first frequency. The BS may transmit the slot RP in a second frequency different from the first frequency. For example, the BS may transmit the sub-slot RP in a first subchannel and the slot RP in a second subchannel different from the first sub-channel. The BS may transmit an indicator to the UE that indicates whether the RP configuration includes the sub-slot RP and/or the slot RP.

The BS may transmit the indicator such that the UE may dynamically switch between using the sub-slot RP or the slot RP on a slot by slot basis. Within any given slot, the UE may use one of the sub-slot RP or the slot RP. The UE may operate as a leading UE when receiving an indicator from the BS as to whether the UE should use the sub-slot RP or the slot RP for a particular slot. In turn, the leading UE may transmit the indicator in the SCI-1 to the following UEs so that the following UEs know whether use the sub-slot RP or the slot RP for the particular slot. In this regard, the BS may increase the utilization of resources in the slot and reduce transmission latency between UEs using sidelink communication.

By way of non-limiting examples, the following aspects are included in the present disclosure.

Aspect 1 includes a method of wireless communication performed by a user equipment (UE), the method comprising mapping a sub-physical sidelink shared channel (sub-PSSCH), sidelink control information (SCI), and an automatic gain control (AGC) symbol to a sub-slot of a plurality of sub-slots of a slot; and transmitting, to at least one other UE, a transport block via the sub-PSSCH of the sub-slot.

Aspect 2 includes the method of aspect 1, wherein the SCI comprises an SCI-1 or an SCI-2; and each sub-slot of the plurality of sub-slots comprises at least one of the SCI; the sub-PSSCH; the AGC symbol; a physical sidelink control channel (PSCCH); or a gap symbol.

Aspect 3 includes the method of any of aspects 1-2, further comprising mapping the AGC symbol to a leading symbol of the sub-slot of the plurality of sub-slots; and mapping a gap symbol to an ending symbol of the sub-slot of the plurality of sub-slots.

Aspect 4 includes the method of any of aspects 1-3, further comprising transmitting, to the at least one other UE, the SCI via the PSCCH, wherein the SCI comprises an SCI-1.

Aspect 5 includes the method of any of aspects 1-4, wherein the SCI-1 comprises at least one of a beta offset associated with an SCI-2; a modulation and encoding scheme of the sub-PSSCH; resource assignments for at least one sub-slot of the plurality of sub-slots; or resource assignments for at least one sub-slot of another slot.

Aspect 6 includes the method of any of aspects 1-5, further comprising transmitting, to the at least one other UE, the SCI via the sub-PSSCH wherein the SCI comprises an SCI-2.

Aspect 7 includes the method of any of aspects 1-6, further comprising mapping a physical sidelink control channel (PSCCH) to the sub-slot; and transmitting a sub-slot SCI-1 via the PSCCH when the UE and the at least one other UE support the plurality of sub-slots of the slot.

Aspect 8 includes the method of any of aspects 1-7, further comprising mapping a physical sidelink control channel (PSCCH) to the sub-slot; and transmitting a sub-slot SCI-1 and an SCI-1 via the PSCCH when at least one of the UE or the at least one other UE does not support the plurality of sub-slots of the slot.

Aspect 9 includes the method of any of aspects 1-8, wherein the SCI-1 is located in a leading sub-slot of the plurality of sub-slots.

Aspect 10 includes the method of any of aspects 1-9, further comprising transmitting an SCI-1 over a physical sidelink control channel (PSCCH) in a leading sub-slot of the plurality of sub-slots, wherein the PSCCH does not include a sub-slot SCI-1.

Aspect 11 includes the method of any of aspects 1-10, further comprising receiving, from a base station (B S), a resource pool (RP) configuration.

Aspect 12 includes the method of any of aspects 1-11, wherein the RP configuration comprises a sub-slot RP in a first frequency; and a slot RP in a second frequency different from the first frequency.

Aspect 13 includes the method of any of aspects 1-12, wherein the RP configuration comprises a sub-slot RP in a first slot and a slot RP in a second slot different from the first slot.

Aspect 14 includes the method of any of aspects 1-13, wherein the RP configuration comprises a sub-slot RP and a slot RP; the receiving the RP configuration comprises receiving, from the BS, an indicator that indicates whether the RP configuration includes the sub-slot RP or the slot RP; and further comprising transmitting, to the at least one other UE, in a leading sub-slot of the plurality of sub-slots an SCI-1 that includes an indicator that indicates to use one of the sub-slot RP or the slot RP.

Aspect 15 includes the method of any of aspects 1-14, wherein the RP configuration comprises a sub-slot RP and a slot RP; at least one resource of the sub-slot RP is common to the slot RP; and the receiving the RP configuration comprises receiving, from the BS, an indicator to utilize one of the sub-slot RP or the slot RP.

Aspect 16 includes the method of any of aspects 1-15, wherein the RP configuration comprises a sub-slot RP and a slot RP; and further comprising transmitting, to the at least one other UE, in a leading sub-slot of the plurality of sub-slots an SCI-1 that includes an indicator that indicates to use one of the sub-slot RP or the slot RP.

Aspect 17 includes the method of any of aspects 1-16, further comprising transmitting, to the at least one other UE, the SCI in a leading sub-slot of the plurality of sub-slots, wherein the SCI includes an indicator that indicates whether the at least one other UE should monitor for a sub-slot SCI-1 on a sub-slot basis or monitor for an SCI-1 on a subchannel basis.

Aspect 18 includes the method of any of aspects 1-17, wherein the SCI includes an indicator that indicates reserved resources; and the reserved resources are based on a sub-slot granularity.

Aspect 19 includes the method of any of aspects 1-18, further comprising transmitting, to the at least one other UE, the SCI in a leading sub-slot of the plurality of sub-slots; and refraining from transmitting, to the at least one other UE, the transport block.

Aspect 20 includes a method of wireless communication performed by a base station (BS), the method comprising transmitting, to a user equipment (UE), a configuration indicating a plurality of sub-slots within a slot, wherein the configuration comprises a number of the sub-slots within the slot; a starting position of each sub-slot within the slot; and a duration of each sub-slot within the slot.

Aspect 21 includes the method of aspect 20, further comprising transmitting, to the UE, an indicator indicating an assignment as a leading UE.

Aspect 22 includes the method of any of aspects 20-21, further comprising transmitting, to the UE, a resource pool (RP) configuration.

Aspect 23 includes the method of any of aspects 20-22, wherein the RP configuration comprises a sub-slot RP in a first frequency and a slot RP in a second frequency different from the first frequency.

Aspect 24 includes the method of any of aspects 20-23, wherein the RP configuration comprises a sub-slot RP in a first slot and a slot RP in a second slot different from the first slot.

Aspect 25 includes the method of any of aspects 20-24, wherein the RP configuration comprises at least one of a sub-slot RP or a slot RP; and the transmitting, to the UE, the RP configuration comprises transmitting, to the UE, an indicator that indicates whether the RP configuration includes the sub-slot RP or the slot RP.

Aspect 26 includes the method of any of aspects 20-25, wherein the RP configuration comprises a sub-slot RP and a slot RP; at least one resource of the sub-slot RP is common to the slot RP; and the transmitting, to the UE, the RP configuration comprises transmitting, to the UE, an indicator to utilize one of the sub-slot RP or the slot RP.

Aspect 27 includes a user equipment (UE) comprising a transceiver, a memory, and a processor coupled to the transceiver and the memory, the UE configured to perform any one of aspects 1-19.

Aspect 28 includes a base station (BS) comprising a transceiver, a memory, and a processor coupled to the transceiver and the memory, the BS configured to perform any one of aspects 20-26.

Aspect 29 includes a non-transitory computer-readable medium storing one or more instructions for wireless communication, the one or more instructions comprising one or more instructions that, when executed by one or more processors of a user equipment, cause the one or more processors to perform any one of aspects 1-19.

Aspect 30 includes a non-transitory computer-readable medium storing one or more instructions for wireless communication, the one or more instructions comprising one or more instructions that, when executed by one or more processors of a base station, cause the one or more processors to perform any one of aspects 20-26.

Aspect 31 includes a user equipment (UE) comprising one or more means to perform any one or more of aspects 1-19.

Aspect 32 includes a base station (BS) comprising one or more means to perform any one or more of aspects 20-26.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   mapping a sub-physical sidelink shared channel (sub-PSSCH), sidelink control information (SCI), and an automatic gain control (AGC) symbol to each sub-slot of a plurality of sub-slots of a slot; and
   transmitting, to at least one other UE, a transport block via the sub-PSSCH of the sub-slot.

2. The method of claim 1, wherein:
   the SCI comprises an SCI-1 or an SCI-2; and
   each sub-slot of the plurality of sub-slots comprises at least one of:
   the SCI;
   the sub-PSSCH;
   the AGC symbol;
   a physical sidelink control channel (PSCCH); or
   a gap symbol.

3. The method of claim 1, further comprising:
   mapping the AGC symbol to a leading symbol of the sub-slot of the plurality of sub-slots; and
   mapping a gap symbol to an ending symbol of the sub-slot of the plurality of sub-slots.

4. The method of claim 1, further comprising:
   transmitting, to the at least one other UE, the SCI via a physical sidelink control channel (PSCCH), wherein the SCI comprises an SCI-1.

5. The method of claim 4, wherein the SCI-1 comprises at least one of:
   a beta offset associated with an SCI-2;
   a modulation and encoding scheme of the sub-PSSCH;
   resource assignments for at least one sub-slot of the plurality of sub-slots; or
   resource assignments for at least one sub-slot of another slot.

6. The method of claim 1, further comprising:
   transmitting, to the at least one other UE, the SCI via the sub-PSSCH wherein the SCI comprises an SCI-2.

7. The method of claim 1, further comprising:
   mapping a physical sidelink control channel (PSCCH) to the sub-slot; and
   transmitting a sub-slot SCI-1 via the PSCCH when the UE and the at least one other UE support the plurality of sub-slots of the slot.

8. The method of claim 1, further comprising:
   mapping a physical sidelink control channel (PSCCH) to the sub-slot; and
   transmitting a sub-slot SCI-1 and an SCI-1 via the PSCCH when at least one of the UE or the at least one other UE does not support the plurality of sub-slots of the slot.

9. The method of claim 8, wherein the SCI-1 is located in a leading sub-slot of the plurality of sub-slots.

10. The method of claim 1, further comprising transmitting an SCI-1 over a physical sidelink control channel (PSCCH) in a leading sub-slot of the plurality of sub-slots, wherein the PSCCH does not include a sub-slot SCI-1.

11. The method of claim 1, further comprising receiving, from a network unit, a resource pool (RP) configuration.

12. The method of claim 11, wherein the RP configuration comprises:
    a sub-slot RP in a first frequency; and
    a slot RP in a second frequency different from the first frequency.

13. The method of claim 11, wherein the RP configuration comprises a sub-slot RP in a first slot and a slot RP in a second slot different from the first slot.

14. The method of claim 11, wherein:
    the RP configuration comprises a sub-slot RP or a slot RP;
    the sub-slot RP comprises a same frequency domain resource partition as the slot RP; and
    the receiving the RP configuration comprises receiving, from the network unit, an indicator that indicates whether the RP configuration includes the sub-slot RP or the slot RP; and
    further comprising:
    transmitting, to the at least one other UE, in a leading sub-slot of the plurality of sub-slots an SCI-1 that includes an indicator that indicates to use one of the sub-slot RP or the slot RP.

15. The method of claim 11, wherein:
    the RP configuration comprises a sub-slot RP and a slot RP;
    at least one resource of the sub-slot RP is common to the slot RP; and
    the receiving the RP configuration comprises receiving, from the network unit, an indicator to utilize one of the sub-slot RP or the slot RP.

16. The method of claim 11, wherein:
    the RP configuration comprises a sub-slot RP and a slot RP; and
    further comprising:
    transmitting, to the at least one other UE, in a leading sub-slot of the plurality of sub-slots an SCI-1 that includes an indicator that indicates to use one of the sub-slot RP or the slot RP.

17. The method of claim 11, further comprising:
    transmitting, to the at least one other UE, the SCI in a leading sub-slot of the plurality of sub-slots, wherein the SCI includes an indicator that indicates whether the at least one other UE should monitor for a sub-slot SCI-1 on a sub-slot basis or monitor for an SCI-1 on a subchannel basis.

18. The method of claim 1, wherein:
    the SCI includes an indicator that indicates reserved resources; and
    the reserved resources are based on a sub-slot granularity.

19. The method of claim 1, further comprising:
    transmitting, to the at least one other UE, the SCI in a leading sub-slot of the plurality of sub-slots; and
    refraining from transmitting, to the at least one other UE, the transport block.

20. A user equipment (UE) comprising:
    a transceiver, a memory, and at least one processor coupled to the transceiver and the memory, wherein the UE is configured to:
    map a sub-physical sidelink shared channel (sub-PSSCH), sidelink control information (SCI), and an automatic gain control (AGC) symbol to each sub-slot of a plurality of sub-slots of a slot; and
    transmit, to at least one other UE, a transport block via the sub-PSSCH of the sub-slot.

21. The UE of claim 20, wherein:
the SCI comprises an SCI-1 or an SCI-2; and
each sub-slot of the plurality of sub-slots comprises at least one of:
the SCI;
the sub-PSSCH;
the AGC symbol;
a physical sidelink control channel (PSCCH); or
a gap symbol.

22. The UE of claim 20, wherein the UE is further configured to:
receive, from a network unit, a resource pool (RP) configuration, wherein the RP configuration comprises a sub-slot RP and a slot RP;
receive, from the network unit, an indicator that indicates whether the RP configuration includes the sub-slot RP or the slot RP; and
transmit, to the at least one other UE, in a leading sub-slot of the plurality of sub-slots an SCI-1 that includes an indicator that indicates to use one of the sub-slot RP or the slot RP.

23. A user equipment (UE) comprising:
means for mapping a sub-physical sidelink shared channel (sub-PSSCH), sidelink control information (SCI), and an automatic gain control (AGC) symbol to each sub-slot of a plurality of sub-slots of a slot; and
means for transmitting, to at least one other UE, a transport block via the sub-PSSCH of the sub-slot.

24. The UE of claim 23, wherein:
the SCI comprises an SCI-1 or an SCI-2; and
each sub-slot of the plurality of sub-slots comprises at least one of:
the SCI;
the sub-PSSCH;
the AGC symbol;
a physical sidelink control channel (PSCCH); or
a gap symbol.

25. The UE of claim 23, further comprising:
means for mapping the AGC symbol to a leading symbol of the sub-slot of the plurality of sub-slots; and
means for mapping a gap symbol to an ending symbol of the sub-slot of the plurality of sub-slots.

26. The UE of claim 23, further comprising:
means for transmitting, to the at least one other UE, the SCI via a physical sidelink control channel (PSCCH), wherein the SCI comprises an SCI-1.

27. A non-transitory computer-readable medium having program code recorded thereon, the program code comprising:
code for causing a user equipment (UE) to map a sub-physical sidelink shared channel (sub-PSSCH), sidelink control information (SCI), and an automatic gain control (AGC) symbol to each sub-slot of a plurality of sub-slots of a slot; and
code for causing the UE to transmit, to at least one other UE, a transport block via the sub-PSSCH of the sub-slot.

28. The non-transitory computer-readable medium of claim 27, wherein:
the SCI comprises an SCI-1 or an SCI-2; and
each sub-slot of the plurality of sub-slots comprises at least one of:
the SCI;
the sub-PSSCH;
the AGC symbol;
a physical sidelink control channel (PSCCH); or
a gap symbol.

29. The non-transitory computer-readable medium of claim 27, further comprising:
code for causing the UE map the AGC symbol to a leading symbol of the sub-slot of the plurality of sub-slots; and
code for causing the UE map a gap symbol to an ending symbol of the sub-slot of the plurality of sub-slots.

30. The non-transitory computer-readable medium of claim 27, further comprising:
code for causing the UE to transmit, to the at least one other UE, the SCI via a physical sidelink control channel (PSCCH), wherein the SCI comprises an SCI-1.

\* \* \* \* \*